(12) United States Patent
Toda et al.

(10) Patent No.: US 10,913,485 B2
(45) Date of Patent: Feb. 9, 2021

(54) STEERING CONTROL APPARATUS

(71) Applicant: Mitsubishi Electric Corporation, Tokyo (JP)

(72) Inventors: Taizo Toda, Tokyo (JP); Masaya Endo, Tokyo (JP); Kenji Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 76 days.

(21) Appl. No.: 16/065,835

(22) PCT Filed: Apr. 26, 2016

(86) PCT No.: PCT/JP2016/062965
§ 371 (c)(1),
(2) Date: Jun. 25, 2018

(87) PCT Pub. No.: WO2017/187492
PCT Pub. Date: Nov. 2, 2017

(65) Prior Publication Data
US 2019/0039641 A1 Feb. 7, 2019

(51) Int. Cl.
*B62D 5/04* (2006.01)
*B62D 6/00* (2006.01)

(52) U.S. Cl.
CPC ......... *B62D 5/0463* (2013.01); *B62D 5/0466* (2013.01); *B62D 5/0481* (2013.01); *B62D 6/008* (2013.01); *B62D 5/0409* (2013.01)

(58) Field of Classification Search
CPC .................................................. B62D 5/0463
See application file for complete search history.

(56) References Cited

U.S. PATENT DOCUMENTS

| 2012/0232759 A1* | 9/2012 | Oniwa | B62D 5/0463 |
| | | | 701/41 |
| 2015/0120140 A1* | 4/2015 | Kudo | B62D 5/0472 |
| | | | 701/41 |
| 2017/0066474 A1 | 3/2017 | Toda et al. | |

(Continued)

FOREIGN PATENT DOCUMENTS

| JP | 2003-019974 A | 1/2003 |
| JP | 2003-312521 A | 11/2003 |
| JP | 2009-227125 A | 10/2009 |

(Continued)

OTHER PUBLICATIONS

International Search Report for PCT/JP2016/062965, dated Aug. 9, 2016.

(Continued)

*Primary Examiner* — Miran K Mustafa
(74) *Attorney, Agent, or Firm* — Sughrue Mion, PLLC; Richard C. Turner

(57) ABSTRACT

Based on the result of determination by a friction transition state determination unit, an assist command value correction unit corrects a basic assist command value in such a way that the hysteresis width of steering torque at a time of turning steering increases; then, a current driving unit controls a motor current in such a way that the motor current coincides with a current command value obtained by correcting the basic assist command value by use of an assist command correction value.

8 Claims, 16 Drawing Sheets

(56) References Cited

U.S. PATENT DOCUMENTS

2017/0183027 A1* 6/2017 Kimura ................ B62D 5/0463

FOREIGN PATENT DOCUMENTS

| JP | 2010-195084 A | 9/2010 |
|----|---------------|--------|
| WO | 2015/181948 A1 | 12/2015 |

OTHER PUBLICATIONS

Communication dated Apr. 12, 2019, issued by the European Patent Office in corresponding European Application No. 16900365.4.
Communication dated May 14, 2019, issued by the Japanese Patent Office in corresponding Japanese Application No. 2018-513965.
The State Intellectual Property Office of the P.R. of China Communication dated Jul. 27, 2020, issued in Application No. 201680084750. 9.

* cited by examiner

STEERING CONTROL APPARATUS

This Application is a National Stage of International Application No. PCT/JP2016/062965 filed Apr. 26, 2016.

TECHNICAL FIELD

The present invention relates to a steering control apparatus that generates assist torque corresponding to steering torque exerted on the steering axle by a driver of a vehicle such as an automobile so as to assist the steering by the driver.

BACKGROUND ART

As is well known, a steering control apparatus that assists the steering apparatus of a vehicle such as an automobile by means of the torque of an electric motor is configured in such a way as to transfer the driving force of the electric motor to the steering mechanism by use of a transfer mechanism such as a gear or a belt, through the intermediary of a speed reducer. To date, there has been proposed a steering control apparatus in which in order to suppress a change in the hysteresis width while the on-center feeling of steering torque is maintained and to obtain excellent steering feeling, it is determined by use of steering-axle reaction torque and road-surface reaction torque whether or not the present state is at least in the state of backward-turning operation of the steering and in which in the case where it is determined that the present state is in the state of backward-turning operation of the steering, an assist commanding means corrects a basic assist command value in the increasing direction, based on the steering-axle reaction torque (e.g., refer to Patent Document 1).

In addition, to date, there has been proposed a steering control apparatus in which an assist command correction value is calculated based on the pivoting direction of a steering wheel and a steering speed (e.g., refer to Patent Document 2).

PRIOR ART REFERENCE

Patent Document

[Patent Document 1] Japanese Patent Application Laid-Open No. 2009-227125
[Patent Document 2] Japanese Patent Application Laid-Open No. 2003-19974
[Patent Document 3] Japanese Patent Application Laid-Open No. 2003-312521

DISCLOSURE OF THE INVENTION

Problems to be Solved by the Invention

In such a conventional steering control apparatus as described above, steering-axle reaction torque and road-surface reaction torque are utilized in order to determine the steering state; thus, it is required to provide both a steering-axle reaction torque detection means and a road-surface reaction torque detection means. However, the road-surface reaction torque detection means is configured of a detector such as a load cell provided on a tire; thus, there exist a problem of securing the mounting space for the detector and a problem that the mounting man-hours increase.

The steering state is determined by comparing the steering-axle reaction torque and the road-surface reaction torque; thus, there has been a problem that it is required to accurately detect or estimate the road-surface reaction torque.

Furthermore, there has existed a steering control apparatus (e.g., refer to Patent Document 3) in which the detector such as a load cell is not provided and a road-surface reaction torque estimation means for estimating the road-surface reaction torque is utilized; however, there have been a problem that the designing man-hours for parameters to be utilized in the road-surface reaction torque estimation means increase and a problem that the calculation load on the road-surface reaction torque estimation means increases.

The present invention has been implemented in order to solve the foregoing problems in the conventional apparatus; the objective thereof is to obtain a steering control apparatus in which the friction transition state is determined without utilizing the road-surface reaction torque and excellent steering feeling can be obtained.

Means for Solving the Problems

A steering control apparatus according to the present invention is provided with
  a steering torque detector to detect steering torque of a steering mechanism steered by a driver of a vehicle;
  a vehicle-speed detector to detect a vehicle speed of the vehicle;
  an acceleration value detector to detect an acceleration value of the vehicle;
  a motor that provides steering auxiliary power to the steering mechanism;
  a steering-axle reaction torque calculator to detect or calculate steering-axle reaction torque that acts on a steering axle of the steering mechanism;
  a basic assist command value calculator to calculate a basic assist command value, as a current command value for a motor current to be supplied to the motor, based on at least steering torque detected by the steering torque detector and a vehicle speed detected by the vehicle-speed detector;
  a friction transition state determiner to determine a transition state of friction torque that acts on the steering mechanism, based on the steering-axle reaction torque;
  an assist command value corrector to calculate an assist command correction value for correcting the basic assist command value in such a way that a hysteresis width of steering torque at a time of turning steering is increased, based on the result of determination by the friction transition state determiner; and
  a current driver to receive a current command value obtained by correcting the basic assist command value by use of the assist command correction value and to control the motor current in such a way that the motor current coincides with the current command value; the steering control apparatus is characterized in that the assist command correction value is corrected in such a way that in the case where the acceleration value of the vehicle reaches a predetermined value, the current command value is decreased.

A steering control apparatus according to the present invention includes
  a steering torque detector to detect steering torque of a steering mechanism steered by a driver of a vehicle;
  a vehicle-speed detector to detect a vehicle speed of the vehicle;
  an acceleration value detector to detect an acceleration value of the vehicle;

a motor that provides steering auxiliary power to the steering mechanism;

a basic assist command value calculator to calculate a basic assist command value, based on at least steering torque detected by the steering torque detector and a vehicle speed detected by the vehicle-speed detector;

an assist command value corrector to calculate an assist command correction value for correcting the basic assist command value in such a way that a hysteresis width of steering torque at a time of turning steering by the driver is increased; and a current driver to receive a current command value obtained by correcting the basic assist command value by use of the assist command correction value and to control the motor current in such a way that the motor current coincides with the current command value; the steering control apparatus is characterized in that the current command value is corrected to decrease in the case where the acceleration value of the vehicle reaches a predetermined value.

Advantage of the Invention

A steering control apparatus according to the present invention includes a steering torque detector to detect steering torque of a steering mechanism steered by a driver of a vehicle;

a vehicle-speed detector to detect a vehicle speed of the vehicle;

an acceleration value detector to detect an acceleration value of the vehicle;

a motor that provides steering auxiliary power to the steering mechanism;

a steering-axle reaction torque calculator to detect or calculate steering-axle reaction torque that acts on a steering axle of the steering mechanism;

a basic assist command value calculator to calculate a basic assist command value, as a current command value for a motor current to be supplied to the motor, based on at least steering torque detected by the steering torque detector and a vehicle speed detected by the vehicle-speed detector;

a friction transition state determiner to determine a transition state of friction torque that acts on the steering mechanism, based on the steering-axle reaction torque;

an assist command value corrector to calculate an assist command correction value for correcting the basic assist command value in such a way that a hysteresis width of steering torque at a time of turning steering is increased, based on the result of determination by the friction transition state determiner; and a current driver to receive a current command value obtained by correcting the basic assist command value by use of the assist command correction value and to control the motor current in such a way that the motor current coincides with the current command value; the assist command correction value is corrected in such a way that in the case where the acceleration value of the vehicle reaches a predetermined value, the current command value is decreased; therefore, it is not required to utilize road-surface reaction torque; thus, the friction transition state can accurately be determined. As a result, it is not required to provide a road-surface reaction torque detector; thus, space-saving and reduction of man-hours for mounting can be achieved. Furthermore, it is not required to provide a road-surface reaction torque estimator; thus, there are demonstrated unprecedented prominent effects that the man-hours for designing are reduced and that the calculation load is lightened. Moreover, because the friction transition state can accurately be determined, it is made possible to stably and freely adjust the hysteresis width of the steering torque; concurrently, because it is suppressed that when the driver performs rapid deceleration during turning, the current command value is made to increase by the assist command correction value, the steering torque can be suppressed from becoming light and hence the steering feeling can be raised. In a situation where rapid deceleration and rapid turning steering are required, for example, on a winding road, it is suppressed that at a time of rapid deceleration, the current command value is made to increase by the assist command correction value; thus, it is made possible that the hysteresis width of the steering torque is suppressed from increasing in the transition from turning steering to backward-turning steering so that the steering wheel readily returns to the neutral point.

A steering control apparatus according to the present invention includes a steering torque detector to detect steering torque of a steering mechanism steered by a driver of a vehicle;

a vehicle-speed detector to detect a vehicle speed of the vehicle;

an acceleration value detector to detect an acceleration value of the vehicle;

a motor that provides steering auxiliary power to the steering mechanism;

a basic assist command value calculator to calculate a basic assist command value, based on at least steering torque detected by the steering torque detector and a vehicle speed detected by the vehicle-speed detector;

an assist command value corrector to calculate an assist command correction value for correcting the basic assist command value in such a way that a hysteresis width of steering torque at a time of turning steering by the driver is increased; and a current driver to receive a current command value obtained by correcting the basic assist command value by use of the assist command correction value and to control the motor current in such a way that the motor current coincides with the current command value; the current command value is corrected to decrease in the case where the acceleration value of the vehicle reaches a predetermined value.

It is suppressed that when the driver performs rapid deceleration during turning, the current command value is made to increase by the assist command correction value; thus, the steering torque can be suppressed from becoming light and hence the steering feeling can be raised. In a situation where rapid deceleration and rapid turning steering are required, for example, on a winding road, it is suppressed that at a time of rapid deceleration, the current command value is made to increase by the assist command correction value; thus, it is made possible that the hysteresis width of the steering torque is suppressed from increasing in the transition from turning steering to backward-turning steering so that the steering wheel readily returns to the neutral point.

BEST MODE FOR CARRYING OUT THE INVENTION

Figure 1:
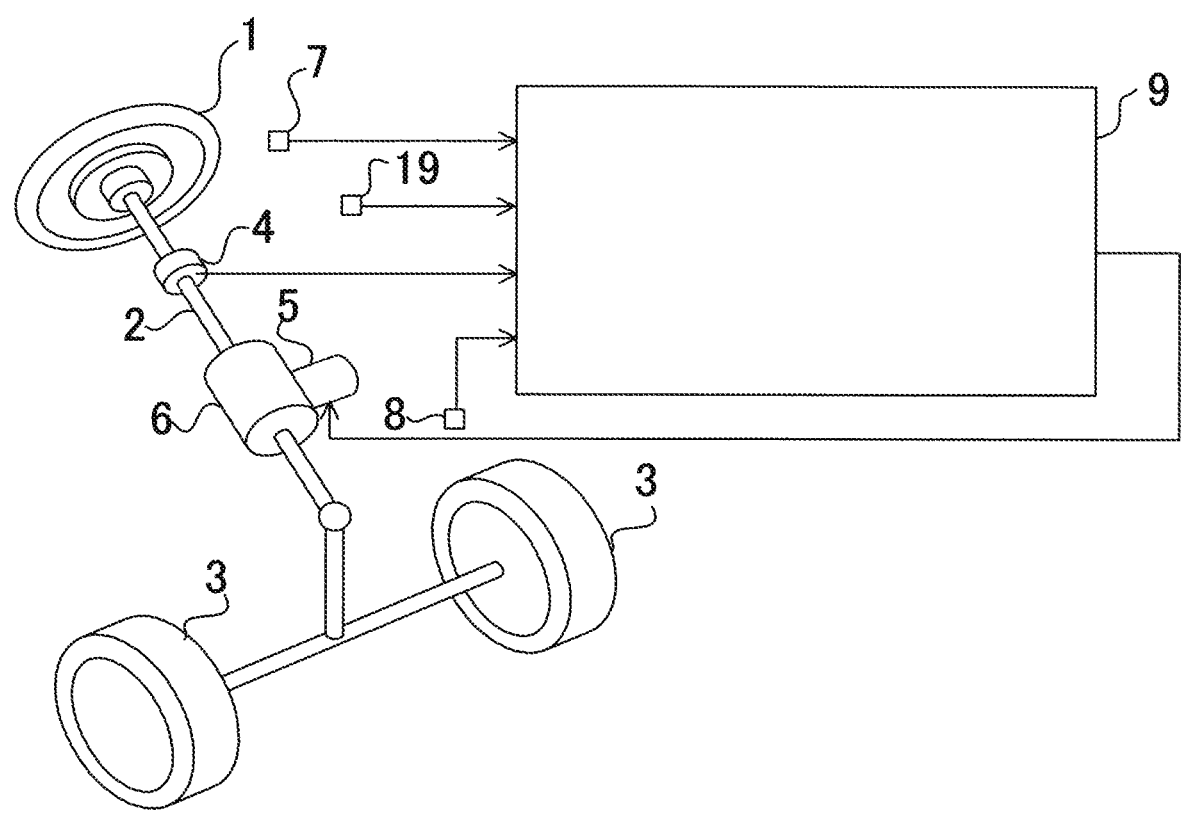
FIG. 1 is a configuration diagram representing a steering control apparatus according to Embodiment 1 of the present invention.

Hereinafter, embodiments of the present invention will be explained with reference to the drawings. In each of the drawings, the same reference characters denote the same or similar constituent elements.

Embodiment 1

FIG. 1 is a configuration diagram representing a steering control apparatus according to Embodiment 1 of the present invention. In FIG. 1, a steering mechanism of a vehicle such as an automobile has a steering wheel 1 and a steering axle 2; left and right turning steering wheels 3 of the vehicle are steered in accordance with the rotation of the steering axle 2 that is rotated through operation of the steering wheel 1 by a driver. A torque sensor 4, which is a steering torque detection unit, as a steering torque detector, is disposed on the steering axle 2; the torque sensor 4 detects steering torque that is produced by the driver and acts on the steering axle 2 through the intermediary of the steering wheel 1.

A motor 5 is coupled with the steering axle 2 through the intermediary of a speed reducing mechanism 6, so that steering auxiliary torque produced by the motor 5 can be provided to the steering axle 2. A vehicle speed sensor 7, which is a speed detection unit, as a vehicle-speed detector detects a traveling speed of the vehicle (hereinafter, refer to a vehicle speed). An acceleration sensor 19, as an acceleration value detection unit, and as an acceleration value detector, detects forward-motion acceleration and backward-motion acceleration of the vehicle. The backward-motion acceleration denote the same meaning as that of the deceleration of the vehicle. A current sensor 8 detects an electric current that flows in the motor 5.

A control unit 9 calculates steering auxiliary torque to be produced by the motor 5 so as to control the electric current, in the motor 5, that is required for producing the steering auxiliary torque. The control unit 9 is provided with a microcomputer (hereinafter, referred to as a MICON) having memories including a ROM and a RAM and a current driving unit, described later. The current driving unit controls a motor current in such a way that the motor current coincides with a current command value corresponding to the steering auxiliary torque calculated by the MICON.

Figure 2:
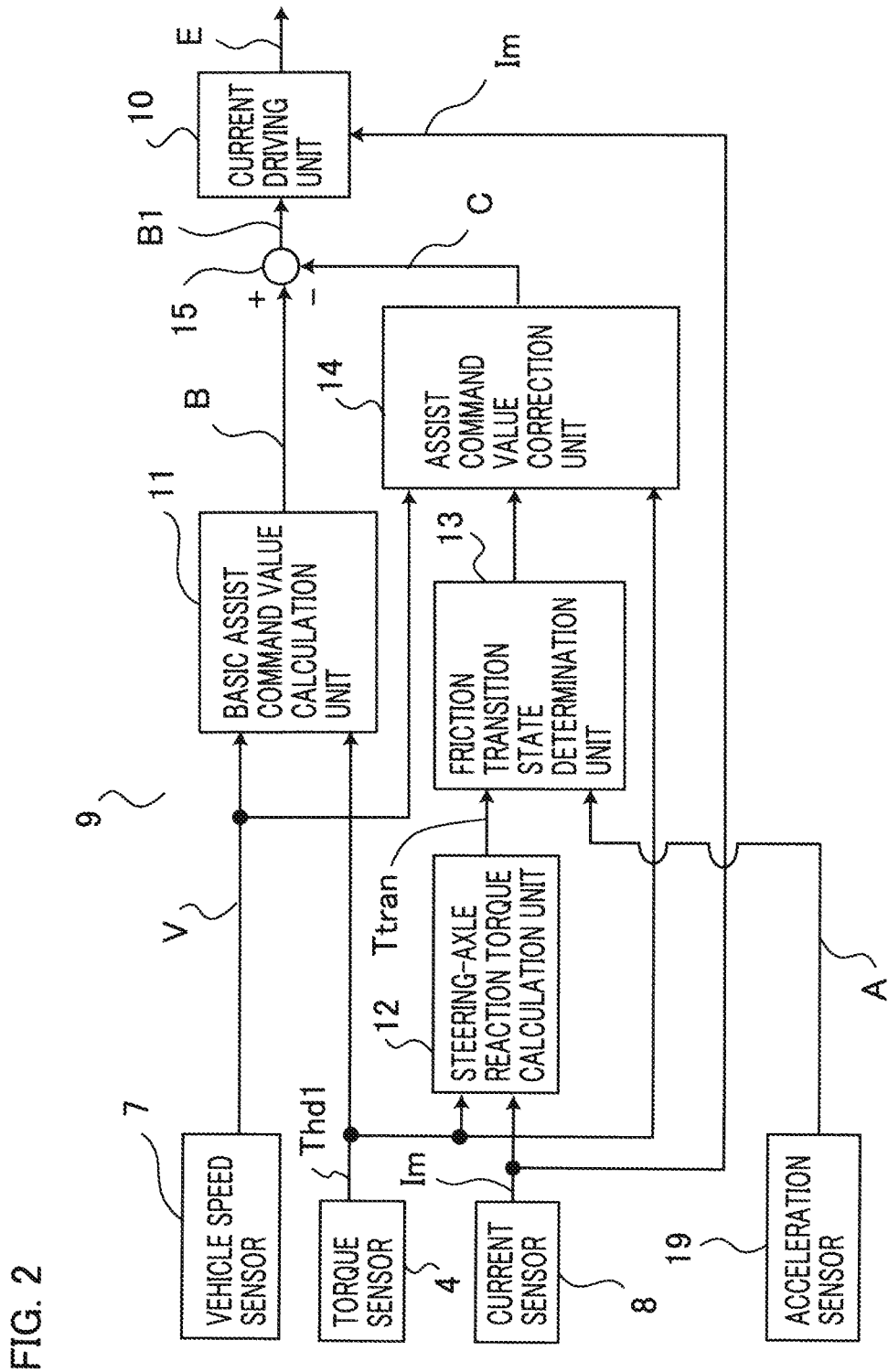
FIG. 2 is a block diagram representing principal parts of the steering control apparatus according to Embodiment 1 of the present invention.

Next, there will be explained the configuration of the control unit 9, which is a principal part of the present invention. FIG. 2 is a block diagram representing principal parts of the steering control apparatus according to Embodiment 1 of the present invention. In FIG. 2, the control unit 9 has a current driving unit 10, as a current driver, that controls the motor current, a basic assist command value calculation unit 11, as a basic assist command value calculator, a steering-axle reaction torque calculation unit 12, as a steering-axle reaction torque calculator, a friction transition state determination unit 13, as a friction transition state determiner, an assist command value correction unit 14, as an assist command value corrector, and a subtracter 15. The basic assist command value calculation unit 11, the steering-axle reaction torque calculation unit 12, the friction transition state determination unit 13, the assist command value correction unit 14, and the subtracter 15 are configured with software provided in the MICON.

Based on at least a vehicle speed V detected by the vehicle speed sensor 7 and a steering torque Thd1 detected by the torque sensor 4, the basic assist command value calculation unit 11 calculates and outputs a basic assist command value B. Based on at least the steering torque Thd1 detected by the torque sensor 4 and a motor current Im, detected by the current sensor 8, that flows in the motor 5, the steering-axle reaction torque calculation unit 12 calculates and outputs a steering-axle reaction torque Ttran. Based on at least the steering-axle reaction torque Ttran outputted from the steering-axle reaction torque calculation unit 12 and an acceleration value A of the vehicle, detected by the acceleration sensor 19, the friction transition state determination unit 13 performs determination on the friction transition state, as described later, and then outputs the result of the determination.

Based on at least the vehicle speed V detected by the vehicle speed sensor 7, the result of the determination on the friction transition state, outputted by the friction transition state determination unit 13, and the steering torque Thd1 detected by the torque sensor 4, the assist command value correction unit 14 outputs an assist command correction value C. The subtracter 15 subtracts the assist command correction value C from the basic assist command value B and then outputs a corrected assist command value B1. Based on the corrected assist command value B1 from the subtracter 15 and the motor current Im detected by the current sensor 8, the current driving unit 10 outputs a current driving signal E for controlling the current in the motor 5. The corrected assist command value B1, as a current command value, is inputted to the current driving unit 10. Hereinafter, in some cases, the corrected assist command value is referred to as a current command value.

Figure 3:
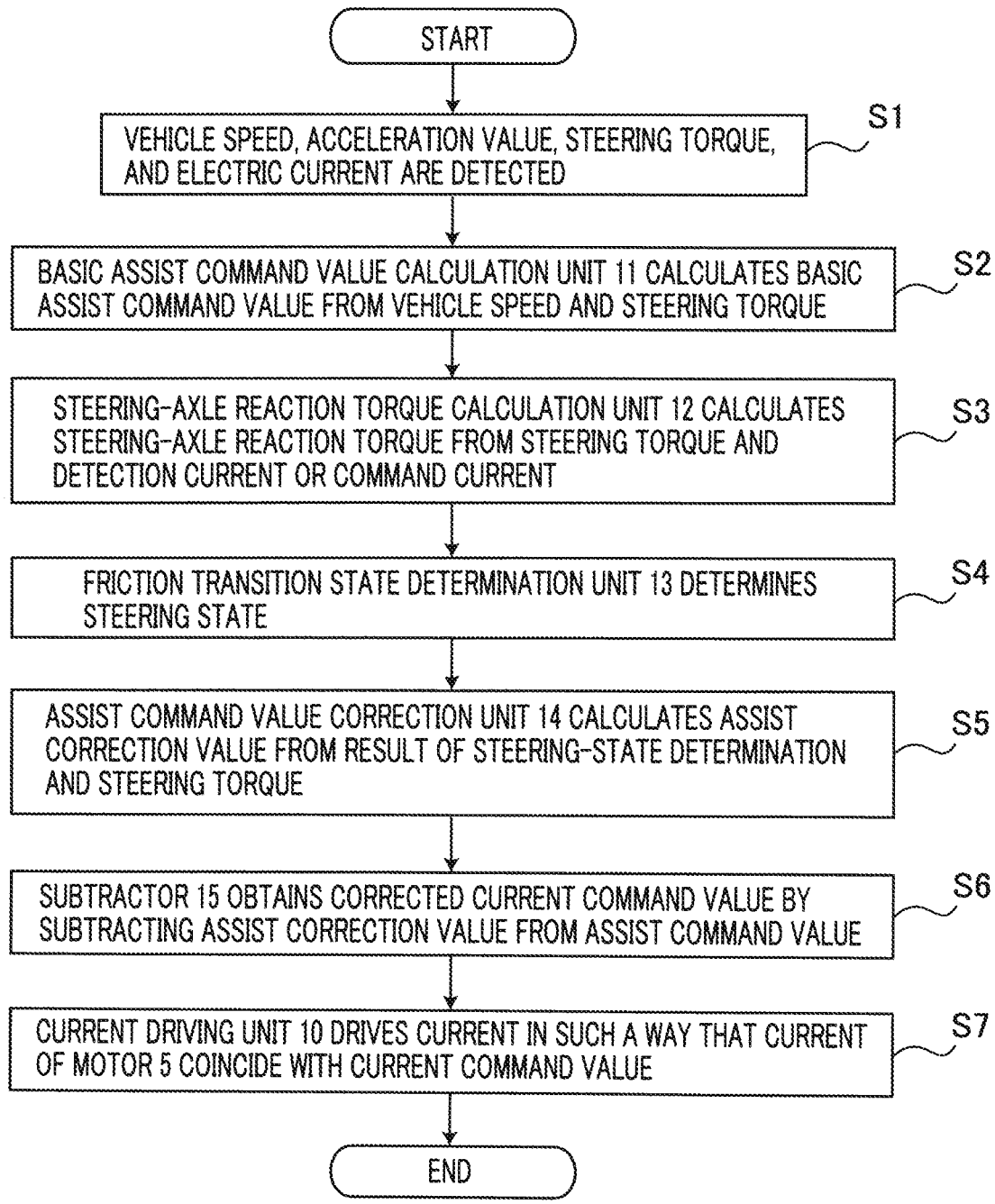
FIG. 3 is a flowchart for explaining the operation of the steering control apparatus according to Embodiment 1 of the present invention.

Next, the operation of the steering control apparatus according to Embodiment 1 of the present invention, especially the operation of the control unit 9, which is a principal part thereof, will be explained. FIG. 3 is a flowchart for explaining the operation of the steering control apparatus according to Embodiment 1 of the present invention. The operation represented in the flowchart in FIG. 3 is repeatedly implemented in a predetermined-time control period. In FIG. 3, at first, in the step S1, the vehicle speed sensor 7 detects the vehicle speed V of the vehicle, the acceleration sensor 19 detects the acceleration value A of the vehicle, and the torque sensor 4 detects the steering torque Thd1. Furthermore, the current sensor 8 detects the motor current Im that flows in the motor 5.

Next, in the step S2, the basic assist command value calculation unit 11 calculates the basic assist command value B, based on at least the vehicle speed V and the steering torque Thd1. The basic assist command value B corresponds to a basic motor current command value for producing steering auxiliary torque that assists the steering by the driver.

Figure 4:
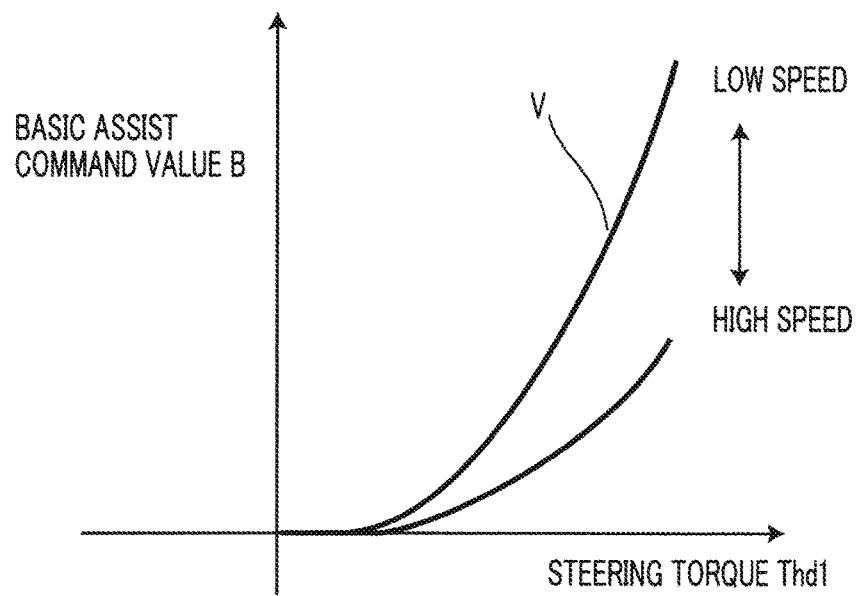
FIG. 4 is a chart representing an assist map of the steering control apparatus according to Embodiment 1 of the present invention.

Based on, for example, the assist map represented in FIG. 4, the basic assist command value calculation unit 11, described above, reads and outputs the basic assist command value B, as a basic current command value. That is to say, FIG. 4 is a chart representing an assist map for the steering control apparatus according to Embodiment 1 of the present invention; the assist map is a map for determining the relationship among the steering torque Thd1, the vehicle speed V, and the basic assist command value B corresponding to a current command value to the motor 5 and is preliminarily created. From the assist map, the basic assist command value calculation unit 11, described above, reads the basic assist command value B, as a basic current command value corresponding to the steering torque Thd1 and the vehicle speed V, and then outputs the basic assist command value B.

As represented in the assist map in FIG. 4, it is preliminarily determined that the larger the steering torque Thd1 is, the larger the basic assist command value B, as the basic motor current command value, becomes and the larger the gradient of the change becomes. In addition, it is preliminarily determined that the larger the vehicle speed V is, the smaller the basic assist command value B becomes. It may be allowed that the basic assist command value B is determined by taking damping torque and the like, obtained from the motor rotation angular velocity, into account.

Next, in the step S3 in FIG. 3, the steering-axle reaction torque calculation unit 12 calculates the steering-axle reaction torque Ttran that acts on a pinion axle 211 (refer to FIG. 1), which is a member at the turning steering wheel side of the speed reducing mechanism 6 on the steering axle 2. In general, the equation of motion for the steering mechanism is expressed by the equation (1) below.

$$[Jp \cdot d^2\theta/dt^2] Thd1 + [Ggear \cdot Kt \cdot Im] - Ttran \qquad (1)$$

where Jp is the inertial moment of the pinion axle 211; $d^2\theta/dt^2$ is the rotation angle acceleration value of the pinion axle 211; Ggear is the speed-reduction ratio of the speed reducing mechanism 6; Kt is the torque constant of the motor; Ttran is the steering-axle reaction torque; [Ggear·Kt·Im] is the motor torque that acts on the pinion axle; and [Jp·$d^2\theta/dt^2$] is the inertial torque.

When it is assumed that the inertial moment Jp of the pinion axle 211 and the rotation angle acceleration value $d^2\theta/dt^2$ of the pinion axle 211 are small and hence the inertial torque[Jp·$d^2\theta/dt^2$] in the left-hand side can be neglected, the steering-axle reaction torque Ttran can be calculated through the equation (2) below.

$$Ttran = Thd1 + [Ggear \cdot Kt \cdot Im] \qquad (2)$$

In other words, in the step S3 in FIG. 3, from the steering torque Thd1 detected by the torque sensor 4 and the motor current Im detected by the current sensor 8, the steering-axle reaction torque calculation unit 12 calculates the steering-axle reaction torque Ttran, based on the equation (2).

In the foregoing equation (2), it may be allowed that in the calculation of the steering-axle reaction torque Ttran, the rotation angle of the motor 5 and the rotation angle of the steering wheel 1 are utilized and the term of the inertial torque [Jp·$d^2\theta/dt^2$] is taken into consideration. In addition, even when in the equation (2), the corrected assist command value B1, as a current command value, is utilized instead of the motor current Im detected by the current sensor 8, the steering-axle reaction torque can accurately be calculated. In the case where in the calculation of the steering-axle reaction torque Ttran through the equation (2), the corrected assist command value B1, as a current command value, is utilized, the immediately previous value of a corrected current command value, described later, is utilized in order to avoid an algebra loop operation.

Next, in the step S4, the friction transition state determination unit 13 performs determination on the friction transition state. In Embodiment 1 of the present invention, it is defined that the friction transition state denotes the changing state of friction acting on the steering axle 2 at a time when the driver is performing steering.

Figure 5A:
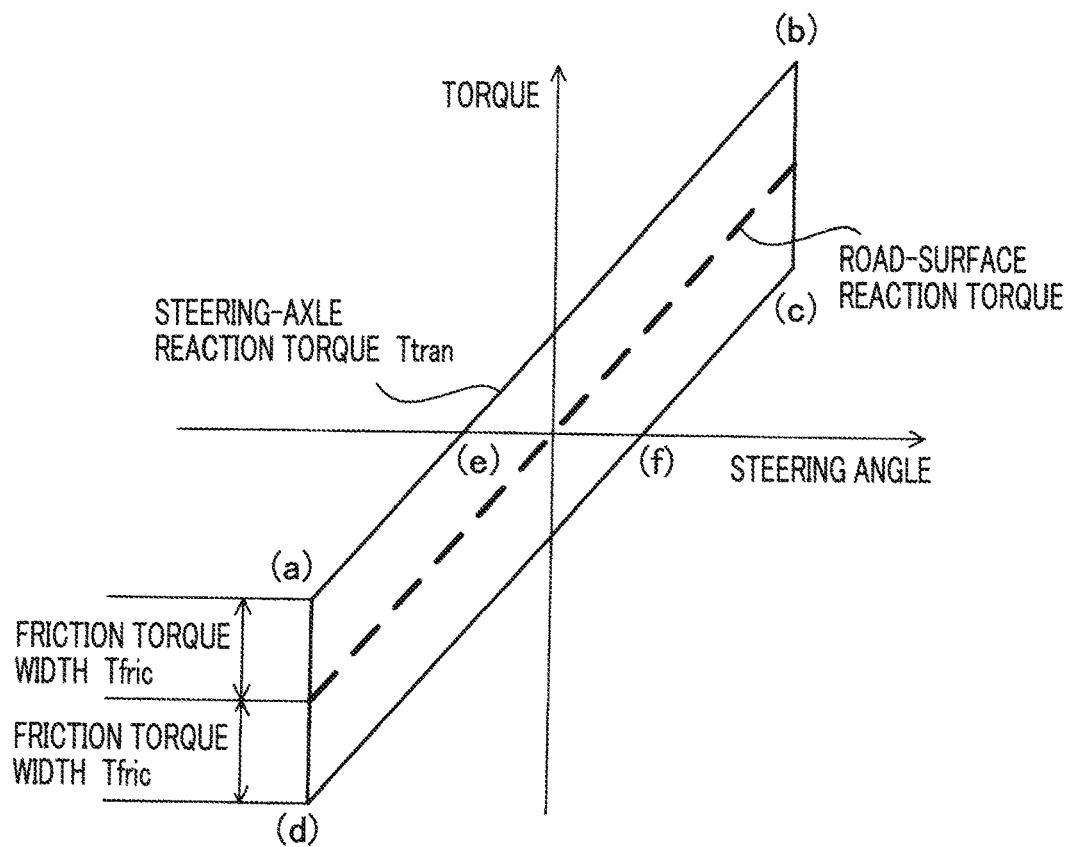
FIG. 5A is an explanatory chart representing the change in the hysteresis width of steering-axle reaction torque in the steering control apparatus according to Embodiment 1 of the present invention.
Figure 5B:
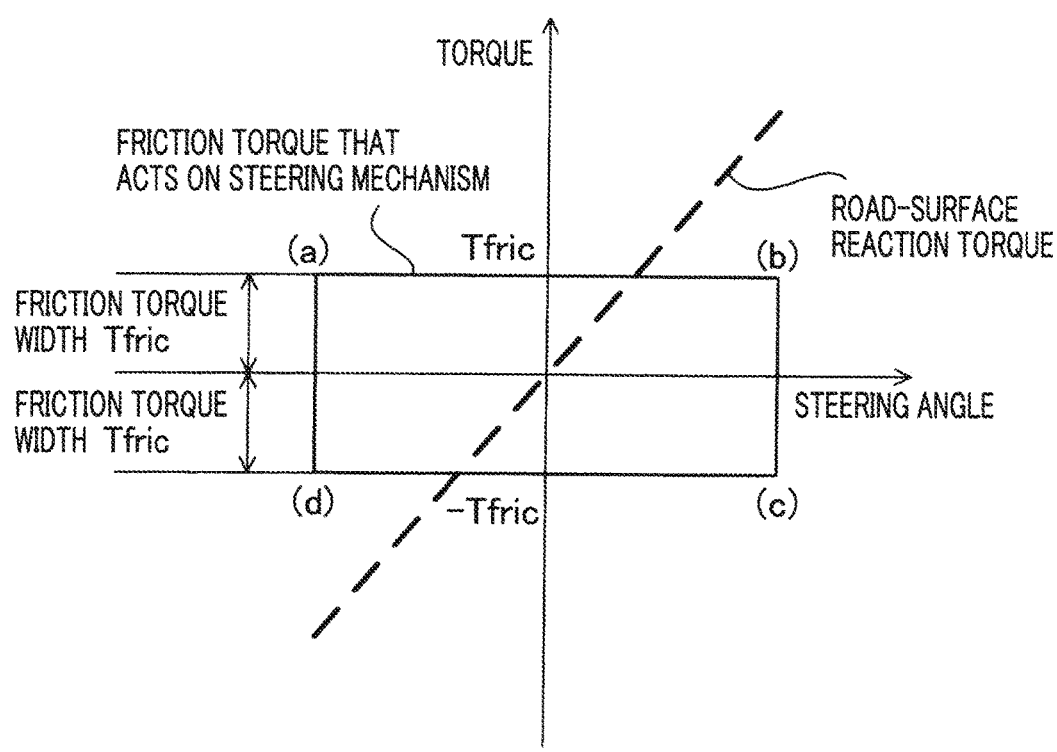
FIG. 5B is an explanatory chart representing the change in the hysteresis width of friction torque that acts on the steering mechanism in the steering control apparatus according to Embodiment 1 of the present invention.

Each of FIGS. 5A and 5B is a chart for explaining the steering-axle reaction torque Ttran vs. the friction change; FIG. 5A is an explanatory chart representing the change in the hysteresis width of steering-axle reaction torque in the steering control apparatus according to Embodiment 1 of the present invention; FIG. 5B is an explanatory chart representing the change in the hysteresis width of friction torque that acts on the steering mechanism in the steering control apparatus according to Embodiment 1 of the present invention. In each of FIGS. 5A and 5B, the road-surface reaction torque indicated by a broken line is reaction force that is produced between the turning steering wheels 3 and the road surface at a time when the turning steering wheels 3 are turned. In FIG. 5A, the steering-axle reaction torque Ttran indicated by a solid line is the reaction torque that acts on the steering axle 2. In FIG. 5B, the friction torque indicated by a solid line is friction torque that acts on the steering mechanism.

As represented in FIG. 5, the friction torque that acts on the steering mechanism has a hysteresis of the friction torque width Tfric. The steering-axle reaction torque Ttran is the torque obtained by summing the road-surface reaction torque indicated by the broken line in FIG. 5B and the friction torque, indicated by the solid line in FIG. 5B, that acts on the steering mechanism; thus, as represented in FIG. 5A, the steering-axle reaction torque Ttran changes with a hysteresis of the friction torque width Tfric in accordance with the change in the steering angle.

Next, there will be explained the change in the hysteresis width of the steering-axle reaction torque Ttran and the hysteresis width of the friction torque that acts on the steering mechanism; in the following explanation, the letters (a), (b), (c), (d), (e), and (f) are marked at respective specific positions of a loop forming the hysteresis in each of FIGS. 5A and 5B, and the respective specific positions of the loop forming the hysteresis will be referred to as the position (a), the position (b), the position (c), the position (d), the position (e), and the position (f).

In each of FIGS. 5A and 5B, when the driver turns the steering angle from the position (a) to the position (b), the friction torque that acts on the steering mechanism acts, as dynamic friction torque. When the driver stops steering at the position (b), the friction torque that acts on the steering mechanism transits to the state of a static friction having a value of (+Tfric). Next, when the driver tries to perform steering from the position (b) to the neutral point of the steering mechanism, the static friction torque decreases as the steering torque exerted on the steering wheel 1 becomes smaller, because the friction torque that acts on the steering mechanism is in the static-friction state; after the friction torque that acts on the steering mechanism becomes zero, the direction in which the friction acts reverses and hence there is produced friction torque that functions as a resistance to the driver's steering toward the neutral point.

Furthermore, at the position (c) where the road-surface reaction torque that attempts to turn the steering wheel 1 back to the neutral point surpasses the sum of the steering torque supporting the steering wheel 1, the steering auxiliary torque of the motor 5, and the static friction torque, the friction torque that acts on the steering mechanism changes from the static friction having a value of (−Tfric) to the dynamic friction and hence the steering axle 2 starts to move toward the neutral point. In other words, from the position (b) to the position (c), the static friction torque is dominant among the friction torques that act on the steering mechanism; the friction torque acts in such a way that external forces that act on the steering axle 2 counterbalance each other and hence the steering axle 2 almost stands still. As described above, when the steering wheel is held in the turning process, the friction torque that acts on the steering mechanism becomes static friction; the static friction has a value between (+Tfric) and (−Tfric).

Furthermore, when increasing turning is performed again in the turning process, the friction torque that acts on the steering mechanism increases in the range between (+Tfric) and (−Tfric) and then has the value of (+Tfric); then, the steering axle 2 starts to move.

When the driver performs steering from the position (c) to the position (d), the hysteresis width of the steering-axle reaction torque Ttran becomes (−Tfric). As is the case with the change from the position (b) to the position (c), in the turning from the position (d) to the position (a), the steering axle 2 stands still; the friction torque that acts on the steering mechanism becomes static friction; the value of the static friction changes from (−Tfric) to (+Tfric); then, friction torque becomes dynamic friction and hence the steering axle 2 starts to move toward the neutral point.

Figure 6:
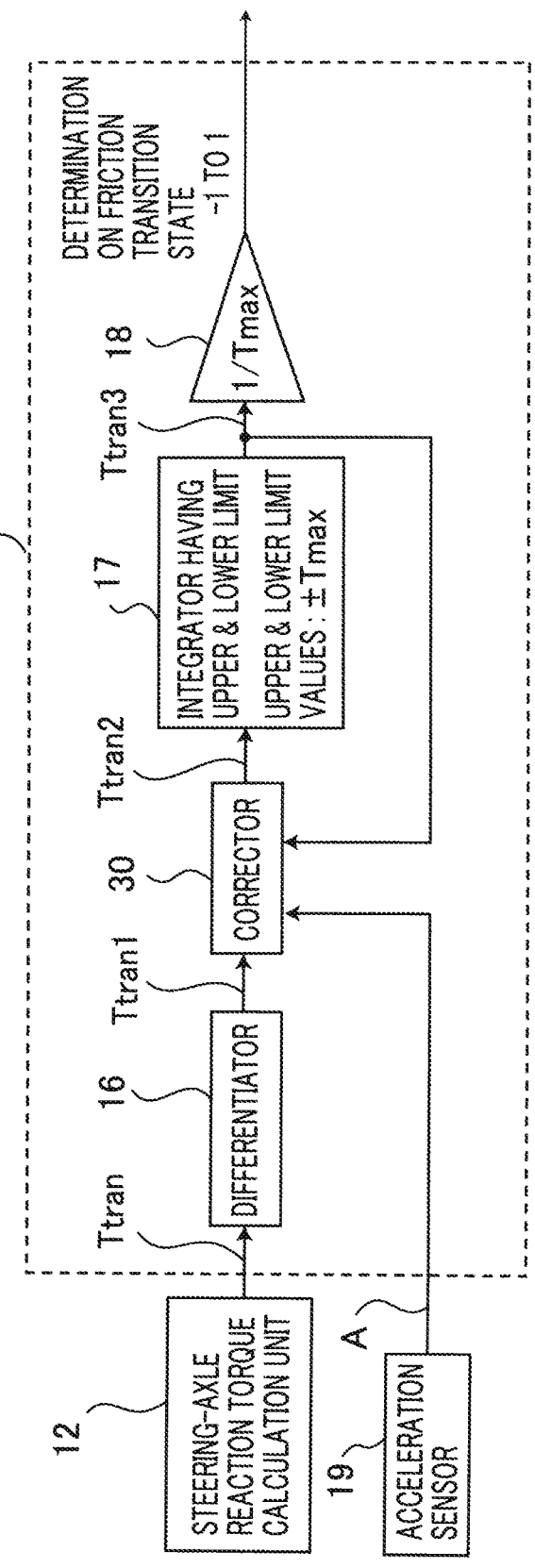
FIG. 6 is a block diagram representing the configuration of a friction transition state determination unit in the steering control apparatus according to Embodiment 1 of the present invention.

FIG. 6 is a block diagram representing the configuration of the friction transition state determination unit 13 in the steering control apparatus according to Embodiment 1 of the present invention. In FIG. 6, a differentiator 16 differentiates the steering-axle reaction torque Ttran from the steering-axle reaction torque calculation unit 12 so as to calculate and output a steering-axle reaction torque changing amount Ttran1. In accordance with the acceleration value A of the vehicle, detected by the acceleration sensor 19, a corrector 30 corrects the steering-axle reaction torque changing amount Ttran1 so as to output a corrected steering-axle reaction torque changing amount Ttran2. The details of the operation of the corrector 30 and the effect thereof will be described later.

An integrator 17 having an upper-and-lower limiting function, the upper limit value and the lower limit value of which are (+Tmax) and (−Tmax), respectively, integrates the steering-axle reaction torque changing amount Ttran1 at a time when not corrected by the corrector 30 or the corrected steering-axle reaction torque changing amount Ttran2 at a time when corrected by the corrector 30 so as to output an integration value Ttran3. In this regard, however, the integrator 17 has a function of limiting an integration value with the foregoing predetermined upper and lower limit values (±Tmax) at a time when the integration operation is performed, and limits the integration value with (±Tmax). The foregoing friction torque width Tfric of the hysteresis of the steering-axle reaction torque Ttran is set to the limit value Tmax, so that the friction torque is extracted from the steering-axle reaction torque.

For example, when the driver performs increasing-turning steering from the neutral point of the steering mechanism, the steering speed is zero at the beginning of the turning; the friction torque that acts on the steering mechanism is in the static-friction state and the value thereof increases to (±Tfric). In this situation, with regard to the change in the steering-axle reaction torque Ttran, the change in the friction torque that acts on the steering mechanism is dominant; the change in the integration value Ttran3, which is the output of the integrator 17, becomes the same as the change in the friction torque and increases up to (±Tfric). After that, the steering axle 2 starts to move; the friction torque that acts on the steering mechanism transits to dynamic friction; the steering-axle reaction torque Ttran increases as the road-surface reaction torque increases, because the change in the road-surface reaction torque becomes dominant. In this situation, the output of the integrator 17 is limited to (±Tfric), due to the foregoing limiting function.

Next, as indicated at the position (b) in each of FIGS. 5A and 5B, when the driver stops the operation of the steering wheel 1, the friction torque that acts on the steering mechanism transits to the region of static friction, and the friction torque remains at (+Tfric). In this situation, because the steering-axle reaction torque Ttran does not change, the integration value Ttran3, which is the output of the integrator 17, is held at (+Tfric). After that, when the driver performs backward turning, the static friction changes from (+Tfric) to zero and then from zero to (−Tfric), as the steering torque Thd1 decreases. As a result, the steering-axle reaction torque Ttran changes from the position (b) to the position (c). Because the differentiator 16 extracts the change in the steering-axle reaction torque Ttran and outputs the steering-axle reaction torque changing amount Ttran1, the integration value Ttran3, which is the output of the integrator 17, changes from (+Tfric) to zero and then from zero to (−Tfric).

In the range from the position (c) to the position (d), the friction torque is in the region of dynamic friction. In this case, the steering-axle reaction torque Ttran changes in accordance with the change in the road-surface reaction torque; however, the output of the integrator 17 is limited to (−Tfric), due to the limiting function. In the turning steering from the position (d) to the position (a), the steering axle 2 stands still, and the friction state is in the region of static friction; thus, the friction torque that acts on the steering mechanism changes from (−Tfric) to (+Tfric). In this situation, the change in the static friction torque becomes dominant also in the change in the steering-axle reaction torque; thus, the integration value Ttran3, as the output of the integrator 17 changes from (−Tfric) to (+Tfric) in accordance with the change in the static friction torque.

Here, the operation of the corrector 30 will be explained. In FIG. 6, it is assumed that the acceleration value A of the vehicle, detected by the acceleration sensor 19, becomes the same as or smaller than a negative predetermined value and hence the state where the vehicle is rapidly decelerating is detected. A negative acceleration value A denotes deceleration, and a positive acceleration value A denotes acceleration. In the case where the rapid deceleration is detected and the present steering-axle reaction torque changing amount Ttran1 acts in a direction in which the absolute value of the integration value Ttran3, which is the output of the integrator 17, is further increased, the corrector 30 corrects the steering-axle reaction torque changing amount Ttran1 to zero.

That is to say, in the transition from the state of the position (b) to the state of the position (c) in FIG. 5B, the corrector 30 suppresses the integration value Ttran3, which is the output of the integrator 17, from changing from zero to (−Tfric) so that the integration value Ttran3, which is the output of the integrator 17, is held at zero; in the transition from the state of the position (d) to the state of the position (a) in FIG. 5B, the corrector 30 suppresses the integration value Ttran3, which is the output of the integrator 17, from changing from zero to (+Tfric) so that the output of the integrator 17 is held at zero. In other words, when the vehicle rapidly decelerates, the corrector 30 suppresses the friction transition state determination unit 13 from performing determination on the friction transition state. Because the steering-axle reaction torque changing amount Ttran1 is corrected to zero and is integrated by the integrator 17, the output of the integrator 17 is not discontinuous; thus, the output of the integrator 17 can continuously be corrected.

As described above, the steering-axle reaction torque Ttran calculated by the steering-axle reaction torque calculation unit 12 is processed by the differentiator 16 and the integrator 17 having a limiting function; thus, the change in the friction torque, i.e., the changing states of the dynamic friction and the static friction can be determined. Moreover, the addition of the processing by the corrector 30 makes it possible to prevent the decreasing change in the steering-axle reaction torque Ttran, caused by deceleration of the vehicle, from making the determination on the friction transition state by the friction transition state determination unit 13 change without corresponding to the driver's operation of the steering wheel 1.

A multiplier 18 multiplies the integration value Ttran3, which is the output of the integrator 17, by the reciprocal of the limit value (±Tmax) of the integrator 17 so as to normalize the friction transition state, i.e., the changing state of the hysteresis width of the steering-axle reaction torque Ttran with a value from (−1) to (+1) and to output the normalized friction transition state. That is to say, in the steering from the position (a) to the position (b) in each of FIGS. 5A and 5B, the multiplier 18 outputs (+1); in the turning steering from the position (b) to the position (c), the multiplier 18 outputs (−1) to (+1); in the steering from the position (c) to the position (d), the multiplier 18 outputs (−1); in the turning steering from the position (d) to the position (a), the multiplier 18 outputs (−1) to (+1).

In setting the limit value (±Tmax), the foregoing friction torque width (±Tfric) of measured friction torque that acts on the steering mechanism may be utilized. It is not required that the limit value (±Tmax) is a fixed value. The friction of the steering mechanism provides an effect to the friction torque width Tfric; thus, for example, the friction torque width Tfric may be changed in accordance with at least one of the vehicle speed, the steering angle, the steering torque, the steering-axle reaction torque Ttran, the road-surface reaction torque, and the ambient temperature, that relate to the friction of the steering mechanism. This makes it possible to accurately determine the friction transition state even when the hysteresis width of the steering-axle reaction torque Ttran changes.

Next, in the step S5 in FIG. 3, the assist command value correction unit 14 calculates the assist command correction value C, based on the steering torque Thd1 and the result of determination on the friction transition state by the friction transition state determination unit 13.

Figure 7:
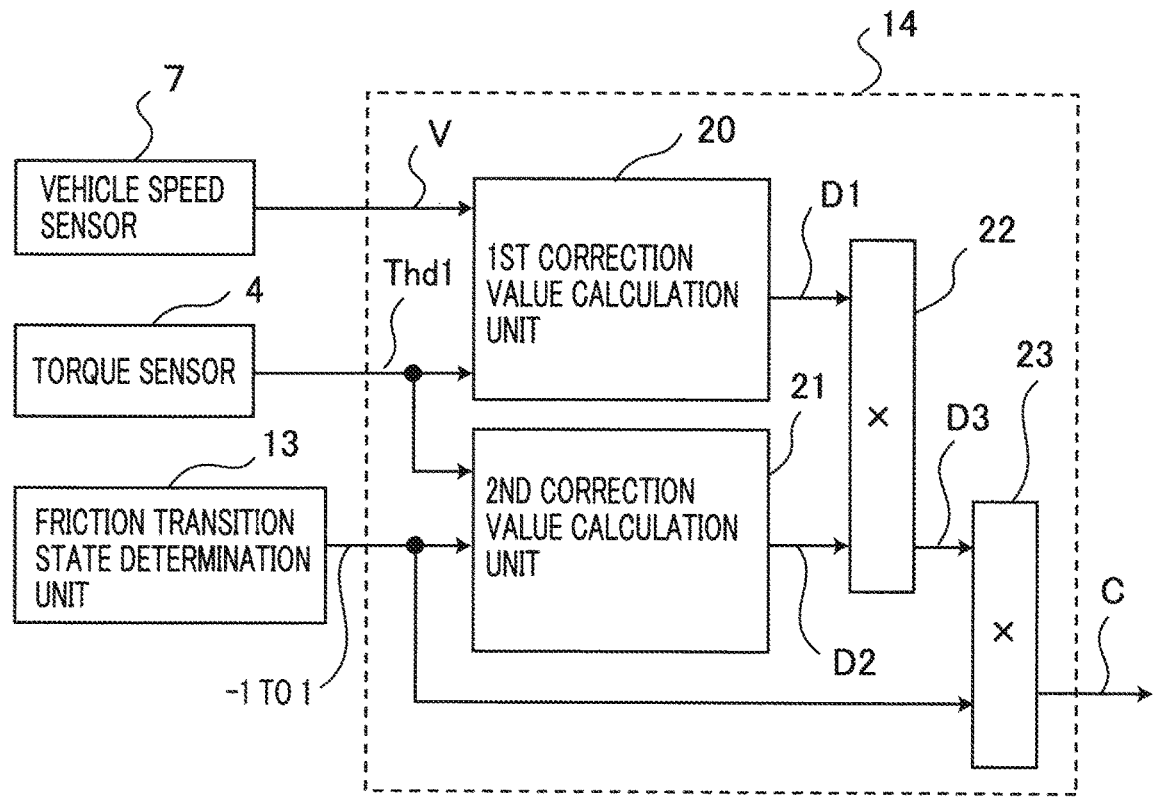
FIG. 7 is a block diagram representing the configuration of an assist command value correction unit in the steering control apparatus according to Embodiment 1 of the present invention.
Figure 8:
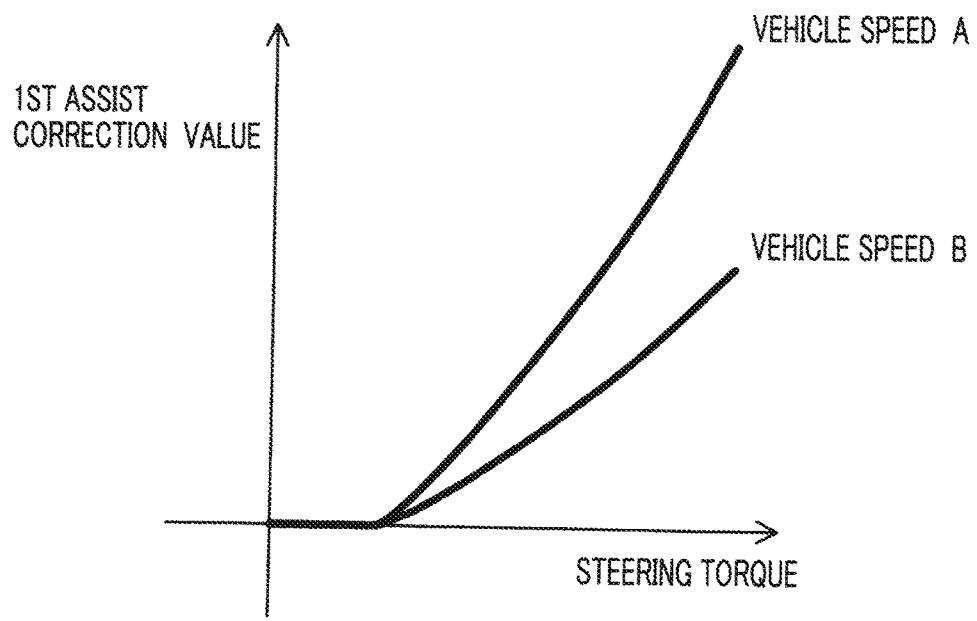
FIG. 8 is a chart representing a map for a first correction value in the steering control apparatus according to Embodiment 1 of the present invention.

FIG. 7 is a block diagram representing the configuration of the assist command value correction unit 14 in the steering control apparatus according to Embodiment 1 of the present invention. In FIG. 7, the assist command value correction unit 14 is provided with a first correction value calculation unit 20, a second correction value calculation unit 21, and multipliers 22 and 23. The first correction value calculation unit 20 calculates a first correction value D1 for calculating the assist command correction value C, in accordance with the vehicle speed V and the steering torque Thd1. Specifically, for example, a first correction value map for determining the relationship among the steering torque Thd1, the vehicle speed V, and the first correction value D1 is preliminarily created, and then the first correction value D1 corresponding to the steering torque Thd1 and the vehicle speed V is read from the first correction value map. FIG. 8 represents an example of the first correction value map. That is to say, FIG. 8 is a chart representing the first correction value map in the steering control apparatus according to Embodiment 1 of the present invention.

The first correction value calculation unit 20 can adjust the assist command correction value C in accordance with the vehicle speed V, so that the hysteresis width of the steering torque Thd1 can be adjusted in accordance with the vehicle speed V; thus, the steering feeling can be optimized.

The second correction value calculation unit 21 limits the region where correction of the basic assist command value B is implemented. In other words, the second correction value calculation unit 21 calculates a second correction value D2 for determining whether or not the correction of the basic assist command value B can be corrected. In this case, when the sign of the steering torque Thd1 and the sign indicating the normalized result of the determination on the friction torque transition state, obtained from the friction transition state determination unit 13, are different from each other, the region is set as an assist correction implementation region, and the second correction value D2 is set to "1". In the other regions, i.e., when the sign of the steering torque Thd1 and the sign indicating the normalized result of the determination on the friction transition state, obtained from the friction transition state determination unit 13, are the same, the second correction value D2 is set to "0".

As a result, in part of the region from the position (b) to the position (c), in the region from the position (c) to the position (f), in part of the region from the position (d) to the position (a), and in the region from the position (a) to the position (e), represented in foregoing FIG. 5A, the second correction value D2 is set to "1".

The multiplier 22 multiplies the first correction value D1 by the second correction value D2 and outputs the multiplication result as a third correction value D3. The multiplier 23 multiplies the third correction value D3 by the normalized result (−1) to (+1) of determination on the friction transition state, obtained from the friction transition state determination unit 13, and outputs the multiplication result as the assist command correction value C.

Next, in the step S6 in FIG. 3, the subtracter 15 subtracts the assist command correction value C from the basic assist command value B, so that the corrected assist command value B1, as a corrected current command value, is obtained. That is to say, the multiplier 23 represented in FIG. 7 outputs the assist command correction value C obtained by multiplying the third correction value D3 by the normalized result (−1) to (+1) of determination on the friction transition state; in backward-turning steering after turning, the subtracter 15 represented in FIG. 2 performs correction in such a way that the basic assist command value B, as the basic current command value, is increased with the assist command correction value C; then the corrected basic assist command value B is outputted, as the corrected assist command value B1. That is to say, in part of the region from the position (b) to the position (c), in the region from the position (c) to the position (f), in part of the region from the position (d) to the position (a), and in the region from the position (a) to the position (e), represented in FIG. 5A, the corrected assist command value B1 obtained by performing correction in such a way that the basic assist command value B increases is outputted; the current in the motor 5 increases and hence the output torque of the motor 5 increases; thus, the assist amount produced by the steering auxiliary torque to be exerted on the steering mechanism increases.

Next, in the step S7 in FIG. 3, the current driving unit 10 generates the current driving signal E in such a way that the current in the motor 5 coincides with the corrected assist command value B1, which is the corrected current command value, and drives the current; the motor 5 produces steering auxiliary torque corresponding to the corrected current command value.

Figure 17:
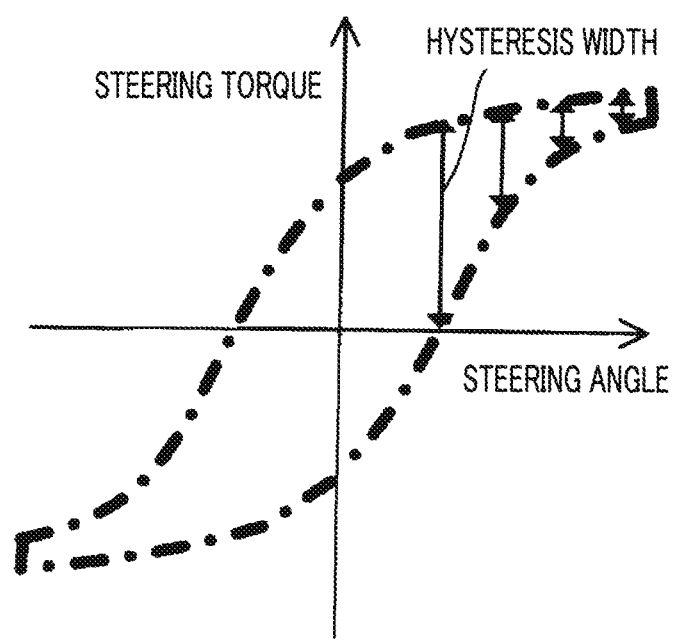
FIG. 17 is an explanatory chart representing the characteristics of the steering torque vs. the steering angle in a conventional apparatus.

Next, the effect in the steering control apparatus according to Embodiment 1 of the present invention will be explained in comparison with a conventional apparatus. FIG. 17 is an explanatory chart representing the characteristics of the steering torque vs. the steering angle in the conventional apparatus. As represented in FIG. 17, in the conventional apparatus, the steering-axle reaction torque has hysteresis characteristics, due to the effect of friction torque that acts on the steering mechanism, as disclosed in foregoing Patent Document 1. Accordingly, hysteresis characteristics exist also in the steering torque to which steering auxiliary torque produced by the electric power steering has been added.

With regard to the hysteresis width in the hysteresis characteristics of the conventional apparatus, the hysteresis width of the steering torque decreases, as indicated by the arrows in FIG. 17, as the steering angle and the steering torque become larger. When the hysteresis width of the steering torque decreases, there exist the problems that it is difficult to maintain the steering holding state and that the steering feeling is deteriorated, for example, when backward turning is performed, the feeling of backward turning is enhanced. To cope with these problems, the conventional apparatus disclosed in Patent Document 1 calculates a correction value for correcting the steering-axle reaction torque, by use of the both detectors in a steering-axle reaction torque detection unit and in a road-surface reaction torque detection unit, so as to adjust the hysteresis width of the steering torque.

Figure 18:
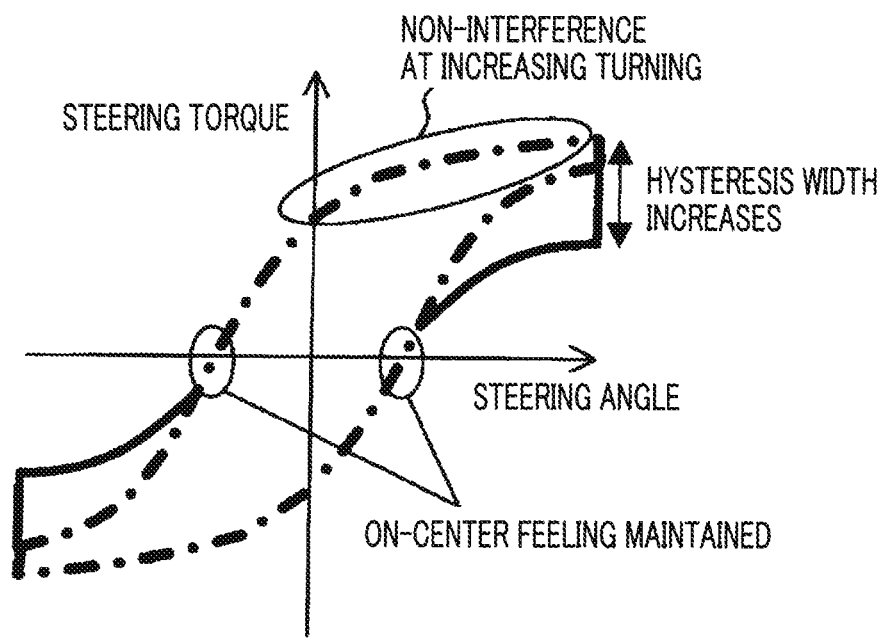
FIG. 18 is an explanatory chart representing the adjustment of the hysteresis width of the steering torque.

FIG. 18 is an explanatory chart representing the adjustment of the hysteresis width of the steering torque. It is argued that as the foregoing conventional apparatus, a correction value for correcting the steering-axle reaction torque is calculated by use of the both detectors in a steering-axle reaction torque detection unit and in a road-surface reaction torque detection unit, so that the hysteresis width of the steering torque can be adjusted, as represented in FIG. 18.

In this regard, however, because the road-surface reaction torque is utilized, it is required to provide a road-surface reaction torque detection unit; thus, there have been problems that the mounting space for the road-surface reaction torque detection unit needs to be secured and that the man-hours for the mounting increase. In the case where the detector is not provided and a technology of estimating the road-surface reaction torque is utilized, there have been the problems that the man-hours for designing the parameters to be utilized in the estimator increase and that the calculation load on the estimator increases. Furthermore, because the steering state is determined by comparing the steering-axle reaction torque and the road-surface reaction torque, there has been a problem that a high-accuracy detection value or a high-accuracy estimation value is required for the road-surface reaction torque to be utilized in the determination.

In contrast, the steering control apparatus according to Embodiment 1 of the present invention makes it possible that the assist command correction value C is calculated without utilizing the road-surface reaction torque and by use of only the steering-axle reaction torque Ttran; thus, because the road-surface reaction torque detection unit is not required and hence it is not required to provide the mounting space therefor, neither the man-hours for mounting nor the man-hours for designing the road-surface reaction torque estimator arises. Because the calculation load on the MICON in the steering control apparatus according to the present invention is small in comparison with the calculation load on the road-surface reaction torque estimator, there is demonstrated an effect that the calculation load can be reduced.

Because the steering-axle reaction torque Ttran is calculated by use of the steering torque Thd1 detected by the torque sensor 4 and the motor current Im detected by the current sensor 8, the steering-axle reaction torque Ttran having a high accuracy can be obtained; thus, the friction transition state can accurately be determined.

Furthermore, in the steering control apparatus according to Embodiment 1 of the present invention, the hysteresis width of the steering torque Thd1 is caused by the transition state of the friction torque that acts on the steering mechanism; because the assist command correction value C for correcting the hysteresis width can be calculated based on the friction transition state, the hysteresis width of the steering torque Thd1 can be adjusted without the feeling of discomfort. In particular, because the multiplier 23 obtains the assist command correction value C by multiplying the third correction value D3 by the normalized friction transition state [(−1) to (+1)], it is made possible that in the turning region, the assist command correction value C is continuously provided from zero; thus, the hysteresis width of the steering torque Thd1 can smoothly be adjusted.

The steering control apparatus according to Embodiment 1 of the present invention makes it possible that the steering torque is reduced in the transition from the turning steering to the backward-turning steering, without changing the steering torque at a time of increasing turning and the steering torque in the vicinity of the neutral point, i.e., without changing the on-center feeling of the steering mechanism, so that the hysteresis width of the steering torque is increased.

In addition, for a conventional apparatus, for example, Patent Document 2 has proposed a technology in which the assist command correction value C is calculated based on the pivoting direction of a steering wheel and/or a steering speed. In this conventional apparatus, the hysteresis width of the steering torque is caused by the friction torque of the steering mechanism, and the dynamic friction thereof acts in accordance with the direction of the steering speed; thus, even when the assist command correction value C is based on the pivoting direction of the steering wheel, the state of the dynamic friction can be obtained.

However, in such a conventional apparatus, the steering speed and the static friction do not correspond to each other; thus, it is difficult to determine the transition state, from dynamic friction to static friction or from static friction to dynamic friction, of the friction torque that acts on the steering mechanism at a time of the turning steering from the position (b) to the position (c) and from the position (d) to the position (a) represented in FIG. 5A. As a result, in the case where the steering speed is utilized for correcting the assist torque command, it is difficult to provide the assist command correction value corresponding to the change in the friction torque that acts on the steering mechanism; thus, there exist problems that the feeling of discomfort arises in the turning region and that vibration is caused because the assist command correction value is rapidly provided. Because in order to suppress such vibration, measures, for example, implementation of the processing by use of a lowpass filter having a low cut-off frequency, are required, the response is delayed; thus, there exists a problem that the feeling of discomfort is caused.

In contrast, in the steering control apparatus according to Embodiment 1 of the present invention, a change in the transition state of the friction torque that acts on the steering mechanism is directly and accurately calculated, and then the basic assist command value is corrected in accordance with the change; therefore, the steering feeling can appropriately be adjusted by means of simply configured control logic. Moreover, the corrector 30 is provided in the friction transition state determination unit 13; thus, it can be prevented that although the driver does not perform turning steering, rapid deceleration of the vehicle makes the steering-axle reaction torque decrease and hence it is determined that the present friction state is in the state of transition from static friction to dynamic friction, caused by backward-turning steering.

In other words, the steering control apparatus according to Embodiment 1 of the present invention makes it possible to accurately determine the friction transition state even when the vehicle is rapidly decelerated. As a result, it can be prevented that although the driver does not perform turning steering, the basic assist command value B, as the basic current command value, is made to increase by the assist command correction value C. For example, it is suppressed that when the driver performs rapid deceleration during turning, the basic assist command value B, as the basic current command value, is made to increase by the assist command correction value C; thus, the steering torque can be suppressed from becoming light and hence the steering feeling can be raised. Because the friction transition state continuously changes, the assist command correction value C can also continuously be decreased and hence smooth steering can be realized. The reason why the steering-axle reaction torque Ttran is decreased by the rapid deceleration of the vehicle is that there exists a characteristic that the road-surface reaction torque decreases as the vehicle speed V decreases.

Furthermore, as another effect of the steering control apparatus according to Embodiment 1 of the present invention, there can be indicated improvement of the steering feeling in a situation where rapid deceleration and rapid turning steering are required, for example, on a winding road. With regard to the conventional apparatus, in the case where in a situation where rapid deceleration and rapid turning steering are required, for example, on a winding road, the current command value is increased so that the hysteresis width of the steering torque is increased in the transition from turning steering to backward-turning steering, the assist toward increasing turning increases for the driver who wants to perform rapid backward-turning steering; as a result, there have been problems that the increased assist provides the feeling of discomfort to the driver and that the backward-turning steering is delayed. However, because in the case of the steering control apparatus according to Embodiment 1 of the present invention, it is suppressed that during rapid deceleration on a curved road, the current command value is increased by the assist command correction value, it is made possible that the hysteresis width of the steering torque is suppressed from increasing in the transition from turning steering to backward-turning steering so that the steering wheel readily returns to the neutral point; thus, there is demonstrated an effect that driving on a winding road is readily performed.

In the steering control apparatus according to Embodiment 1 of the present invention, the acceleration value of the vehicle is detected by use of the acceleration sensor 19; however, the present invention is not limited the configuration, and the acceleration value of the vehicle may be obtained by differentiating the vehicle speed detected by the vehicle speed sensor 7.

Embodiment 2

Next, a steering control apparatus according to Embodiment 2 of the present invention will be explained. The steering control apparatus according to Embodiment 2 of the present invention differs from that of Embodiment 1, described above, in the configuration and the operation of the friction transition state determination unit. The other configurations and operational actions are basically the same as those in Embodiment 1; thus, the same reference numerals will be utilized for the configurations in common with those in Embodiment 1. In the following explanation, the configuration and the operation, of the friction transition state determination unit, that are different from those of Embodiment 1 will mainly be explained.

Figure 9:
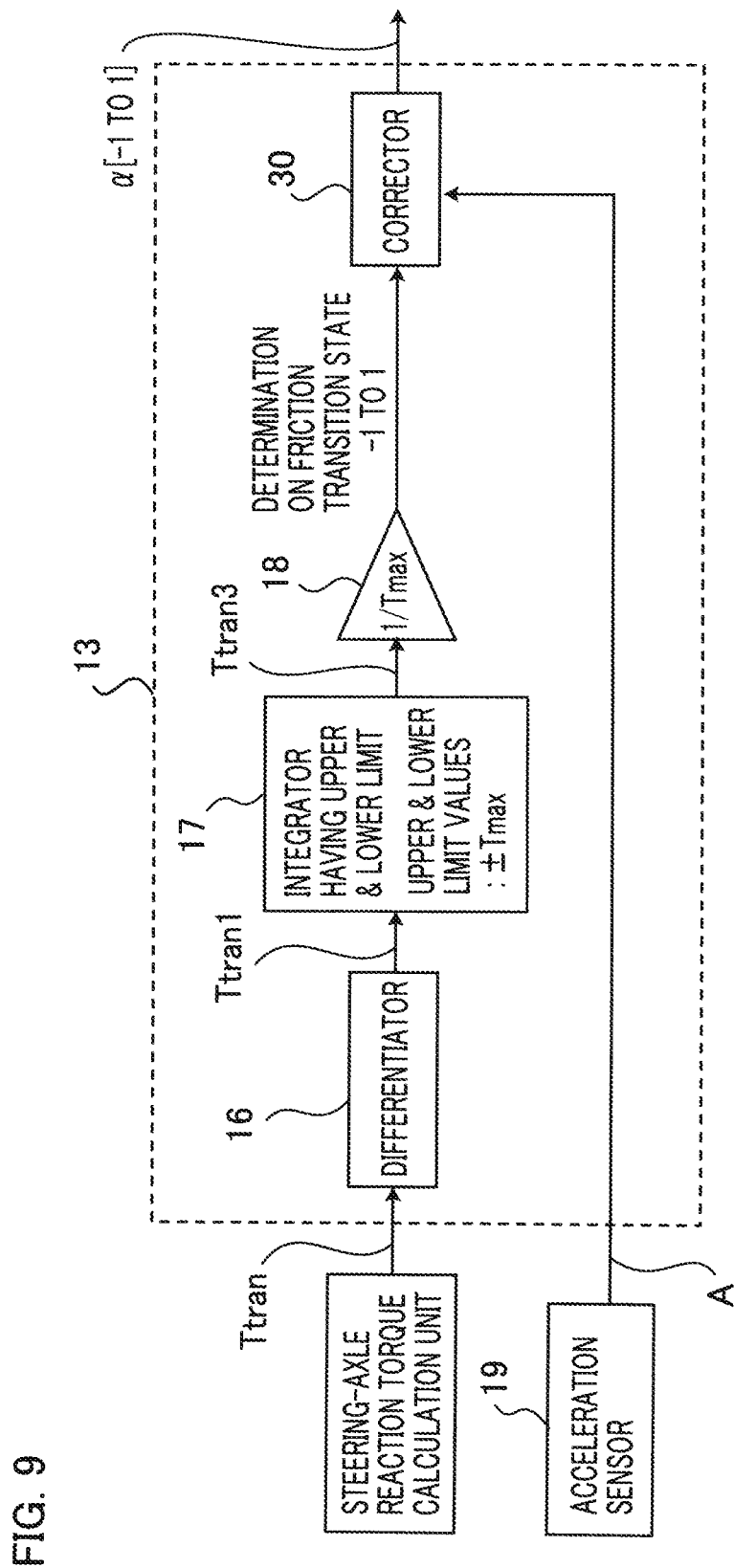
FIG. 9 is a block diagram representing the configuration of a friction transition state determination unit in a steering control apparatus according to Embodiment 2 of the present invention.

FIG. 9 is a block diagram representing the configuration of the friction transition state determination unit in the steering control apparatus according to Embodiment 2 of the present invention. In FIG. 9, the corrector 30 provided in the friction transition state determination unit 13 corrects the friction transition state determination value [(−1) to (+1)] from the multiplier 18, in accordance with the acceleration value A of the vehicle, detected by the acceleration sensor 19. In the case where the acceleration value A of the vehicle, detected by the acceleration sensor 19, becomes the same as or smaller than a negative predetermined value and hence the state where the vehicle is rapidly decelerated is detected, the friction transition state determination value is corrected to a smaller value, by being multiplied by a correction gain a that is smaller than "1". As a result, because the multiplier 23 represented in FIG. 7 multiplies the third correction value D3 by the corrected friction transition state determination value a [(−1) to (+1)] so that the assist command correction value C is obtained, the assist command correction value C can be set to a value that is smaller than a usual value. As a result, the same effect as that in Embodiment 1 can be obtained also in the steering control apparatus according to Embodiment 2 of the present invention.

Embodiment 3

Next, a steering control apparatus according to Embodiment 3 of the present invention will be explained. The steering control apparatus according to Embodiment 3 of the present invention differs from that of each of Embodiments 1 and 2, described above, in the respective configurations and operational actions of the friction transition state determination unit and the assist command value correction unit. The other configurations and operational actions are basically the same as those in each of Embodiments 1 and 2; thus, the same reference numerals will be utilized for the configurations in common with those in each of Embodiments 1 and 2. In the following explanation, the respective configurations and operational actions of the friction transition state determination unit and the assist command value correction unit will mainly be explained.

Figure 10:
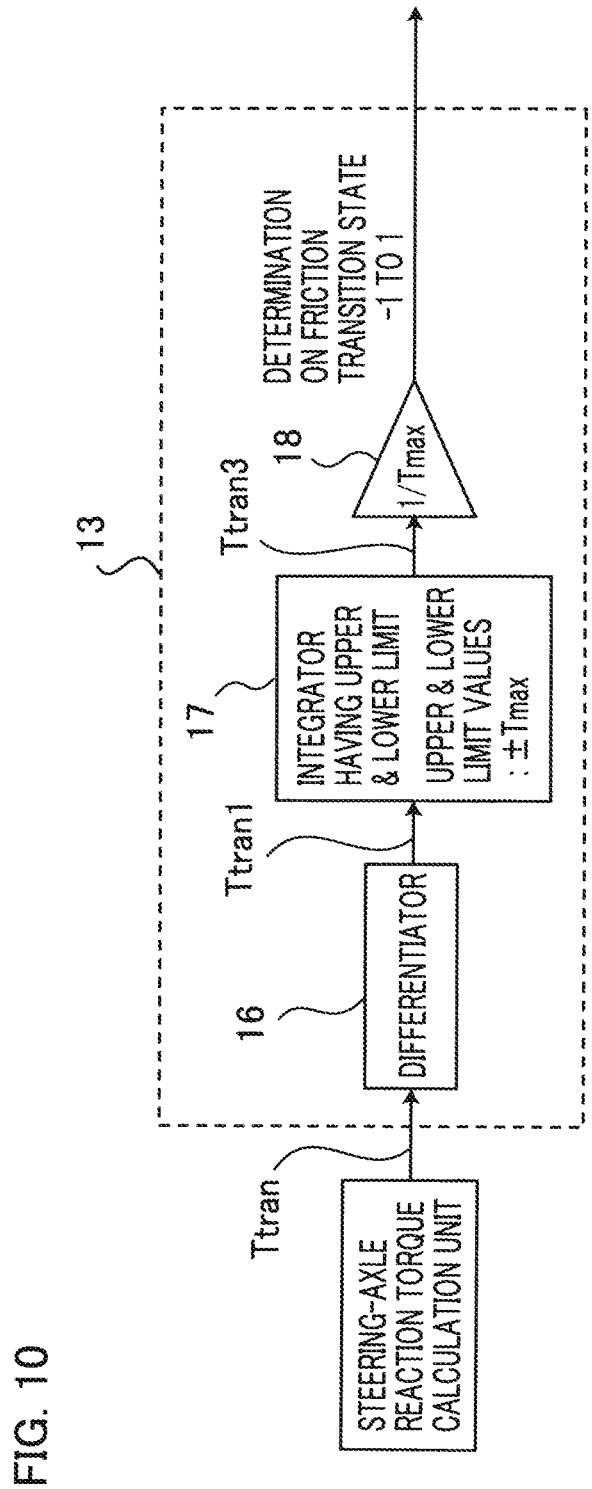
FIG. 10 is a block diagram representing the configuration of a friction transition state determination unit in a steering control apparatus according to Embodiment 3 of the present invention.
Figure 11:
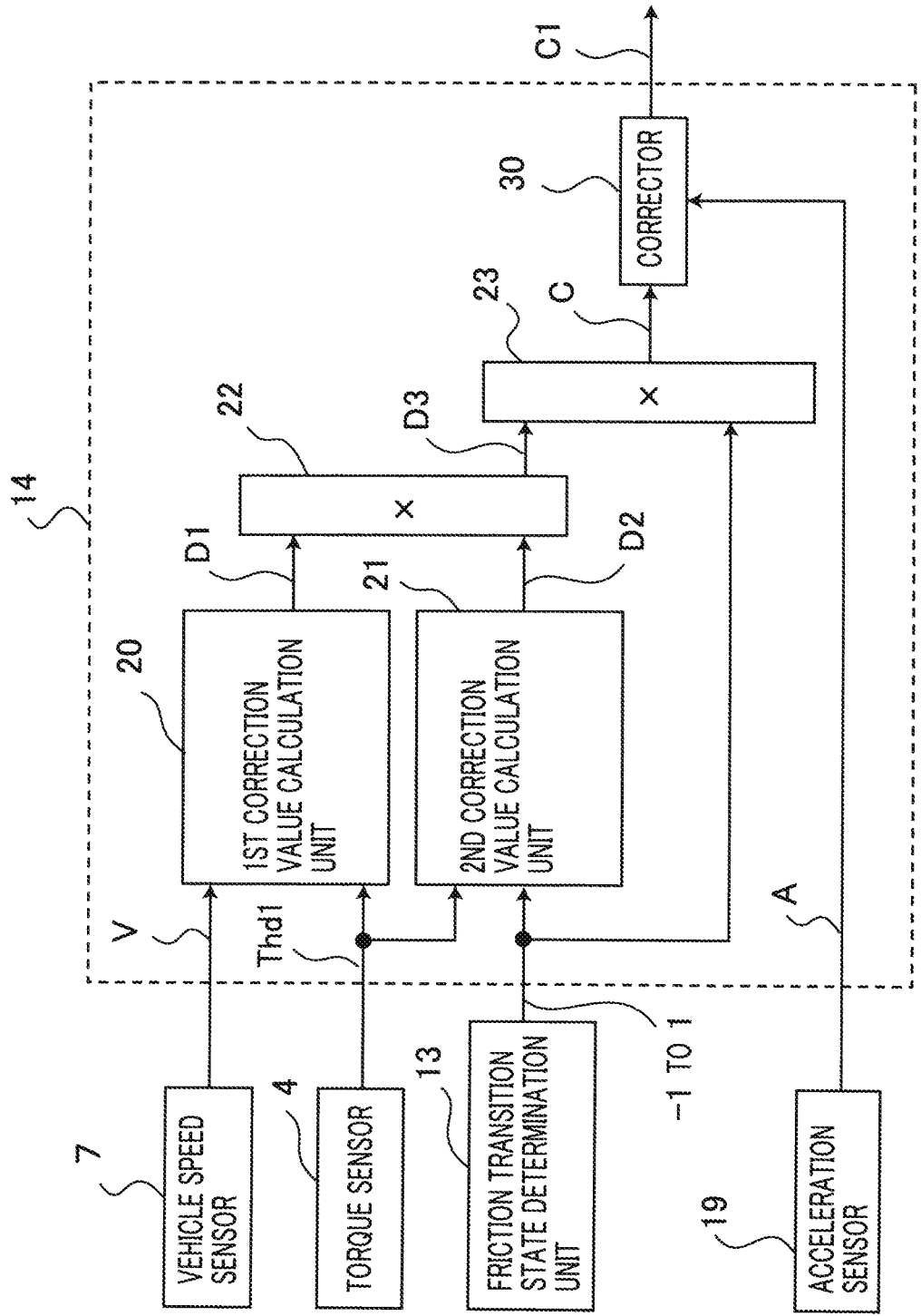
FIG. 11 is a block diagram representing the configuration of an assist command value correction unit in the steering control apparatus according to Embodiment 3 of the present invention.

FIG. 10 is a block diagram representing the configuration of the friction transition state determination unit in the steering control apparatus according to Embodiment 3 of the present invention; FIG. 11 is a block diagram representing the configuration of the assist command value correction unit in the steering control apparatus according to Embodiment 3 of the present invention. The steering control apparatus according to Embodiment 3 of the present invention differs from each of foregoing Embodiments 1 and 2; the corrector 30 for making the correction value change in accordance with the acceleration value is provided in the assist command value correction unit 14 so as to correct the assist command correction value in accordance with the acceleration value.

That is to say, in FIG. 11, in the case where the acceleration value A of the vehicle, detected by the acceleration sensor 19, becomes the same as or smaller than a negative predetermined value and hence the state where the vehicle is rapidly decelerated is detected, the corrector 30 multiplies the assist command correction value C by a correction gain a that is smaller than "1" so that the friction transition state determination value C is corrected so as to become smaller, and then outputs the corrected assist command correction value C1. As a result, the basic assist command value B can be corrected by the corrected assist command correction value C1, obtained by making the assist command correction value C smaller than a normal value; therefore, the configuration of Embodiment 3 can also demonstrate the same effect as that in each of Embodiments 1 and 2.

The steering control apparatus according to Embodiment 3 of the present invention makes it possible that even in the configuration in which as each of Patent Documents 1 and 2, the friction transition state determination unit 13 is not provided, the assist command correction value and the current command value are suppressed from increasing in a situation where rapid deceleration and rapid turning steering are required, for example, on a winding road; as a result, the steering feeling can be raised.

Figure 12:
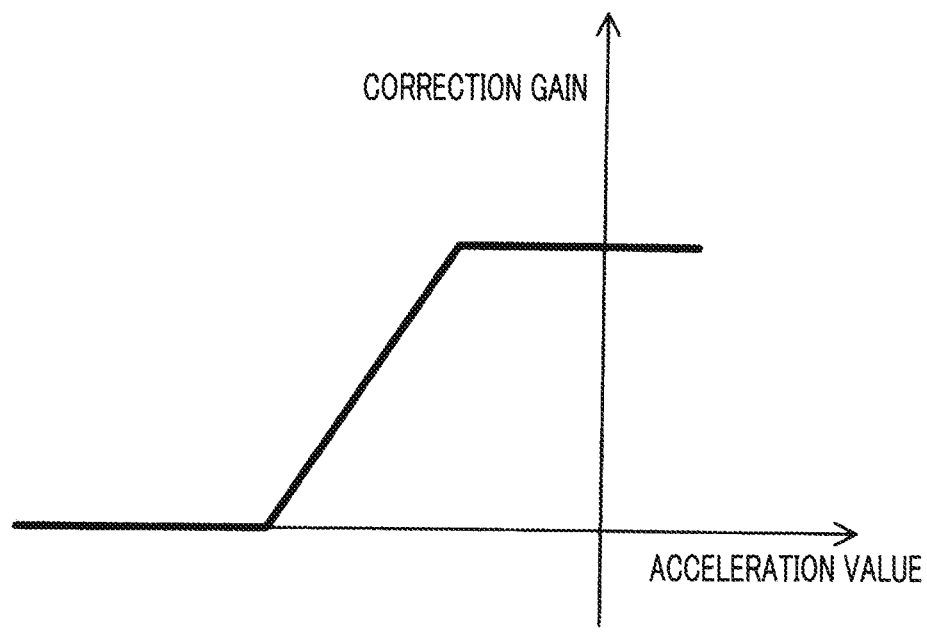
FIG. 12 is a chart representing a map for the correction gain vs. the acceleration, according to Embodiment 3 of the present invention.

FIG. 12 is a chart representing a map for the correction gain vs. the acceleration, according to Embodiment 3 of the present invention. With regard to the correction gain a, it may be allowed that as represented in FIG. 12, the correction gain is set to be smaller as the travel of the vehicle is decelerated more rapidly. It may also be allowed that in order to prevent the correction gain from rapidly changing, lowpass-filter processing is applied to the correction gain. As a result, assist command correction value can smoothly be decreased.

Embodiment 4

Figure 13:
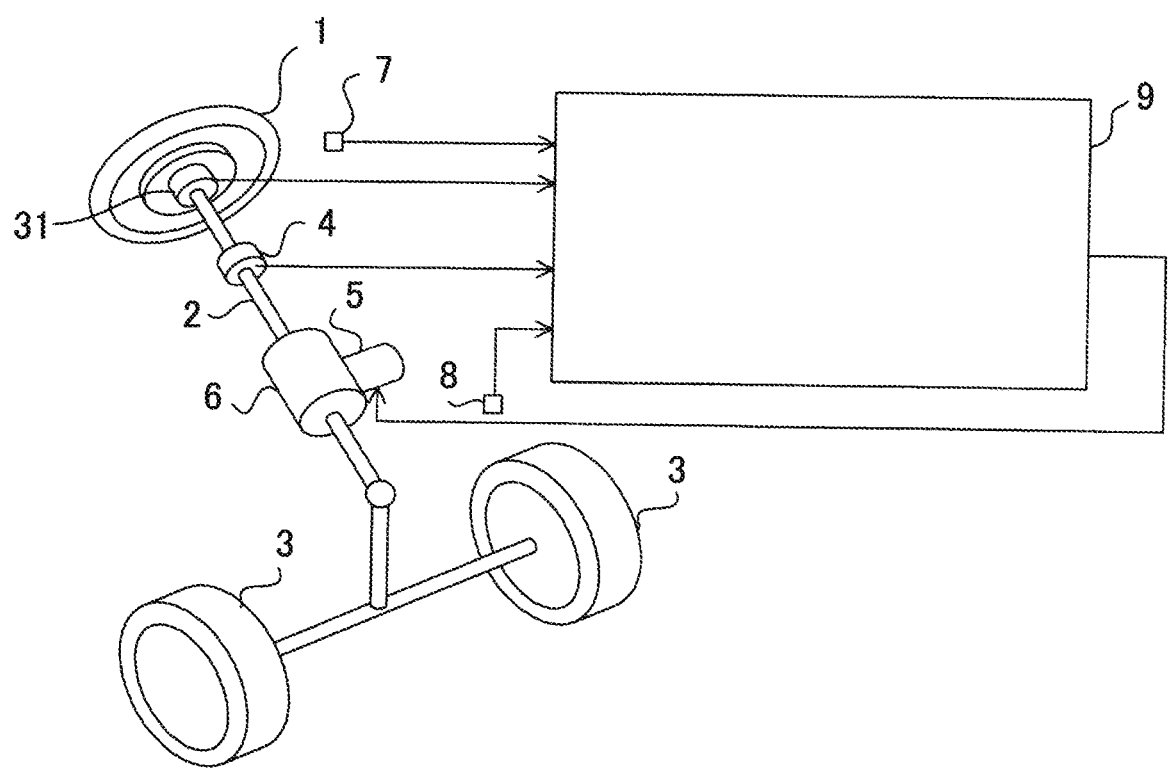
FIG. 13 is a configuration diagram representing a steering control apparatus according to Embodiment 4 of the present invention.
Figure 14:
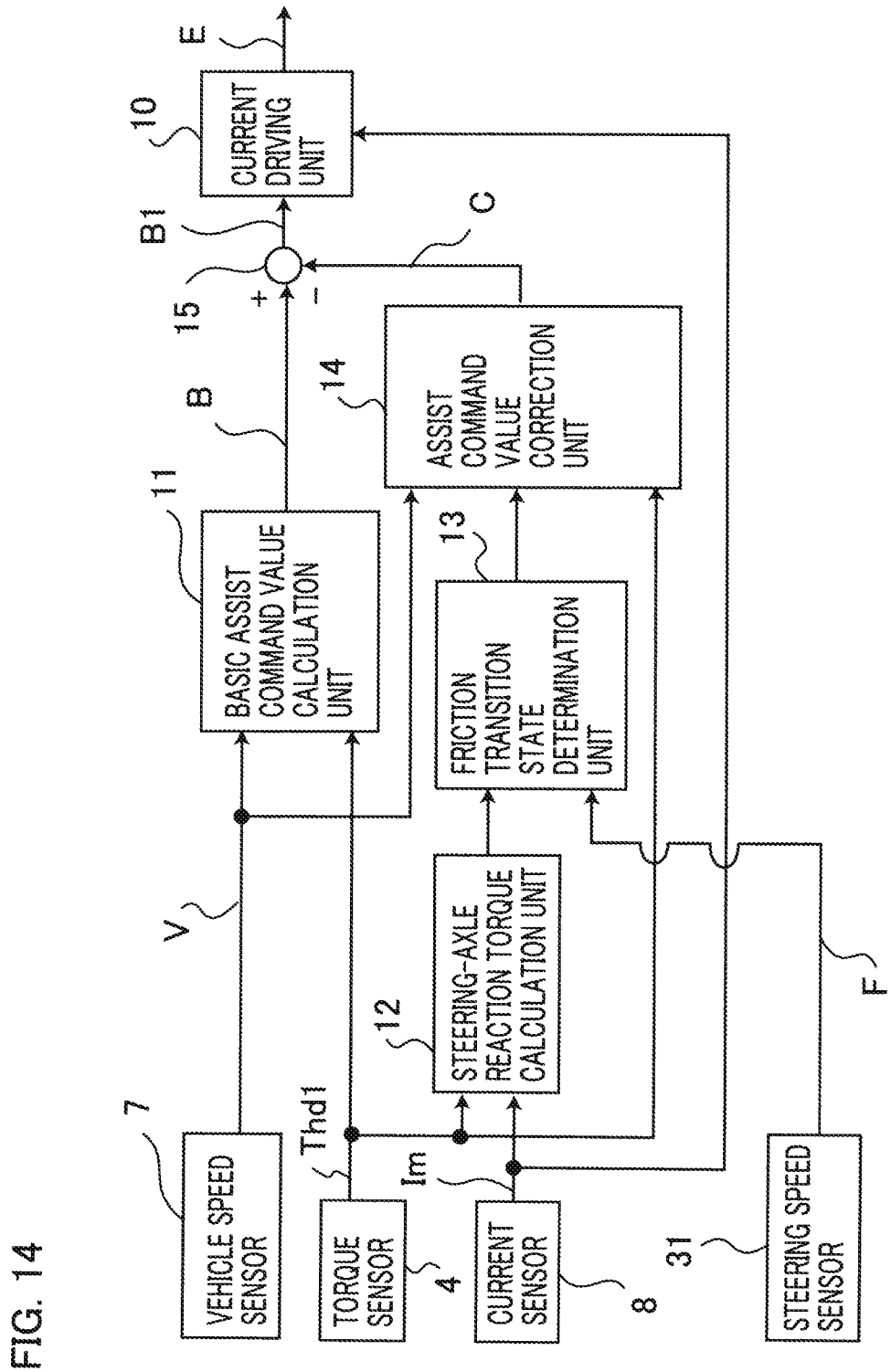
FIG. 14 is a block diagram representing principal parts of the steering control apparatus according to Embodiment 4 of the present invention.

Next, a steering control apparatus according to Embodiment 4 of the present invention will be explained. FIG. 13 is a configuration diagram representing the steering control apparatus according to Embodiment 4 of the present invention. FIG. 14 is a block diagram representing principal parts of the steering control apparatus according to Embodiment 4 of the present invention. The same reference numerals will be provided to the configurations in common with those of each of foregoing Embodiments 1 and 2. In the following explanation, the operation of the friction transition state determination unit 13, which differs from that of Embodiment 1 or 2, will mainly be explained.

In each of foregoing Embodiment 1 or 2, the acceleration sensor 19 is provided, and the assist command correction value C is corrected in accordance with the acceleration value of the vehicle, detected by the acceleration sensor 19; however, in the steering control apparatus according to Embodiment 4, a steering speed sensor 31, as a steering speed detection unit, and as a steering speed detector, is provided, as represented in FIG. 13, and the steering speed sensor 31 determines the steering direction of the steering wheel 1; then, the assist command correction value C is corrected in accordance with the result of the determination; Embodiment 4 differs from each of Embodiments 1 and 2 in the above point.

Figure 15:
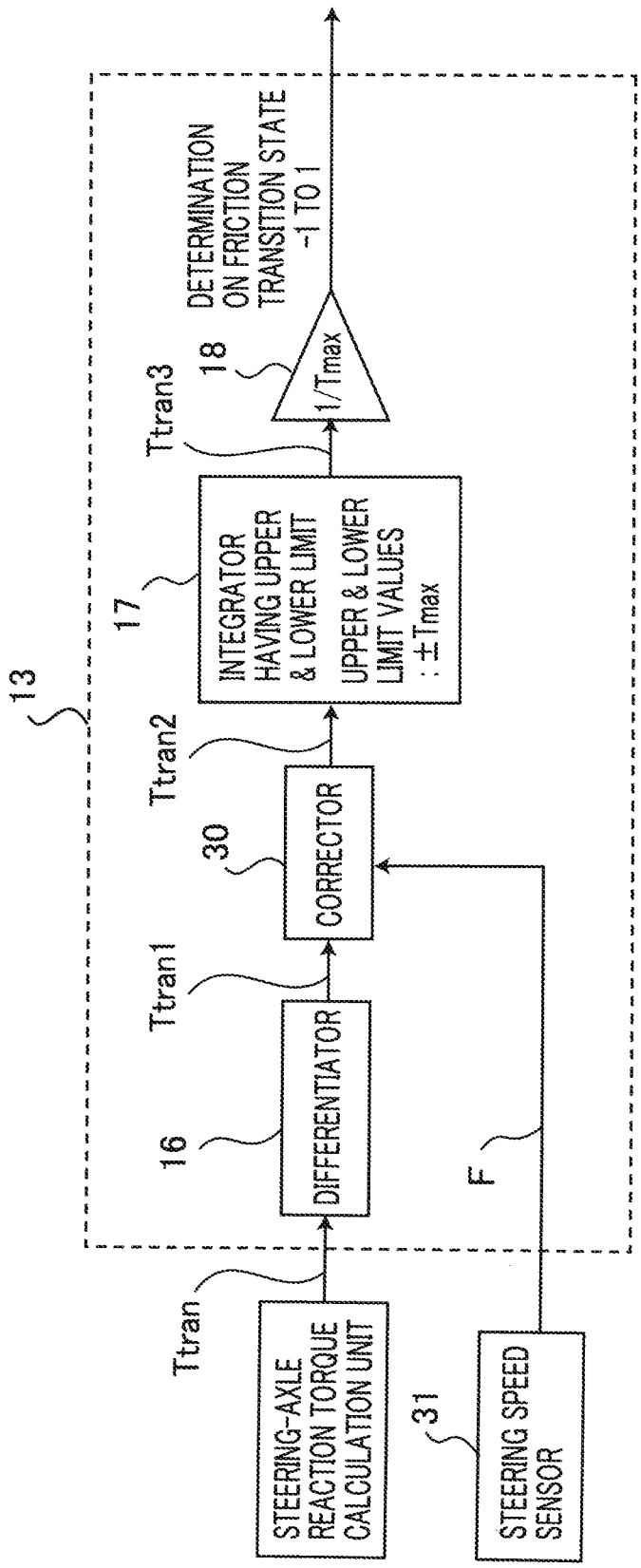
FIG. 15 is a block diagram representing the configuration of a friction transition state determination unit in the steering control apparatus according to Embodiment 4 of the present invention.

FIG. 15 is a block diagram representing the configuration of the friction transition state determination unit in the steering control apparatus according to Embodiment 4 of the present invention. In FIG. 15, in the case where the absolute value of a steering speed F detected by the steering speed sensor 31 is the same as or larger than a predetermined value and the sigh of the steering speed F differs from the sign of the steering-axle reaction torque changing amount Ttran1, the corrector 30 provided in the friction transition state determination unit 13 corrects the steering-axle reaction torque changing amount Ttran1 to be zero.

In the steering from the position (a) to the position (b) in FIG. 5A, the steering speed F is positive. In this situation, the steering-axle reaction torque changing amount Ttran1 is also positive. In this regard, however, in the case where rapid deceleration of the vehicle decreases the road-surface reaction torque, the steering-axle reaction torque Ttran may also decrease and hence the steering-axle reaction torque changing amount may become negative. These situations are determined and then the steering-axle reaction torque changing amount Ttran1 is corrected to be zero and is processed by the integrator 17 having a limiting function so as to be outputted as the integration value Ttran3, so that a change in friction torque, i.e., the changing states of the dynamic friction and the static friction can be determined without undergoing the effect of the change in the road-surface reaction torque, caused by the rapid deceleration of the vehicle.

The steering control apparatus according to Embodiment 4 of the present invention makes it possible to prevent that while the driver performs increasing-turning steering, rapid deceleration of the vehicle makes the steering-axle reaction torque decrease and hence it is determined that the present friction state is in the state of transition from static friction to dynamic friction, caused by backward-turning steering. As a result, it can be prevented that although the driver does not perform turning steering, the basic assist command value B, as the basic current command value, is made to increase by the assist command correction value C. For example, it is suppressed that when the driver performs rapid deceleration during turning, the basic assist command value is made to increase by the assist command correction value; thus, the steering torque can be suppressed from becoming light and hence the steering feeling can be raised.

In Embodiment 4, the steering speed sensor 31 is utilized; however, the present invention is not limited to that configuration. For example, it may be allowed that the steering speed is calculated by differentiating the output of a steering angle sensor provided on the steering wheel 1 or the motor rotation angle of the motor 5. In addition, the steering speed may be estimated from the induction voltage of the motor 5 or the like.

Embodiment 5

Figure 16:
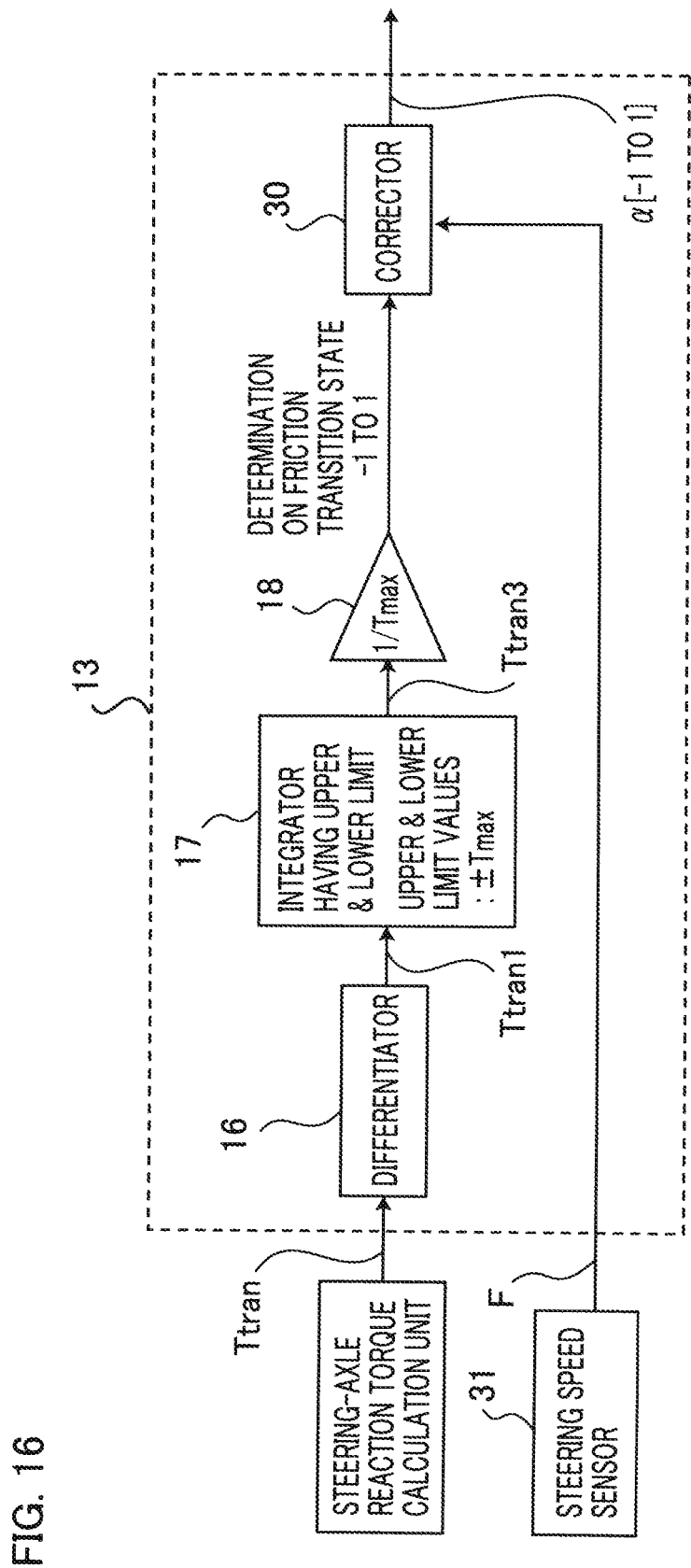
FIG. 16 is a block diagram representing the configuration of a friction transition state determination unit in a steering control apparatus according to Embodiment 5 of the present invention.

Next, a steering control apparatus according to Embodiment 5 of the present invention will be explained. The steering control apparatus according to Embodiment 5 of the present invention differs from that of Embodiment 4, described above, in the configuration of the friction transition state determination unit. FIG. 16 is a block diagram representing the configuration of the friction transition state determination unit in the steering control apparatus according to Embodiment 4 of the present invention. The same reference numerals will be provided to the configurations in common with those of the steering control apparatus according to each of foregoing Embodiments 1, 2, 3, and 4. In the following explanation, the operation of the friction transition state determination unit 13, which differs from that of Embodiment 4, will mainly be explained.

In FIG. 16, the corrector 30 is provided at the poststage of the multiplier 18 in the friction transition state determination unit 13; the friction transition state determination value [(−1) to (+1)] is corrected by multiplying the friction transition state determination value [(−1) to (+1)] by a gain a that is smaller than "1". In the case where the absolute value of the steering speed F detected by the steering speed sensor 31 is the same as or larger than a predetermined value and the sigh of the steering speed differs from the sign of the steering-axle reaction torque changing amount, the corrector 30 performs correction of the friction transition state determination value [(−1) to (+1)] in such a way that the friction transition state determination value [(−1) to (+1)] is made to become smaller by the gain a.

As a result, because the multiplier 23 multiplies the third correction value D3 by the corrected friction transition state determination value so that the assist command correction value C is obtained, the assist command correction value C can be set to a value that is smaller than a usual value. As a result, the same effect as that in Embodiment 4 can be obtained also in the configuration according to Embodiment 5.

In the steering control apparatus according to Embodiment 5 of the present invention, the corrector 30 is situated at the poststage of the multiplier 18; however, it is not required that the present invention is limited to that configuration. For example, the steering control apparatus may be configured in such a way that the assist command correction value C to be finally calculated is corrected by the assist command value correction unit 14 to a smaller value in accordance with the result of determination by the corrector 30.

In the scope of the present invention, the embodiments thereof can freely be combined with one another and can appropriately be modified or omitted.

Each of the respective steering control apparatuses according to foregoing Embodiments 1 through 5 of the present invention is the "reduction to practice" of at least one of the inventions listed below.

(1) A steering control apparatus comprising:
a steering torque detection unit that detects steering torque of a steering mechanism steered by a driver of a vehicle;
a vehicle-speed detection unit that detects a vehicle speed of the vehicle;
an acceleration value detection unit that detects an acceleration value of the vehicle;
a motor that provides steering auxiliary power to the steering mechanism;
a steering-axle reaction torque calculation unit that detects or calculates steering-axle reaction torque that acts on a steering axle of the steering mechanism;
a basic assist command value calculation unit that calculates a basic assist command value, as a current command value for a motor current to be supplied to the motor, based on at least steering torque detected by the steering torque detection unit and a vehicle speed detected by the vehicle-speed detection unit;
a friction transition state determination unit that determines a transition state of friction torque that acts on the steering mechanism, based on the steering-axle reaction torque;
an assist command value correction unit that calculates an assist command correction value for correcting the basic assist command value in such a way that a hysteresis width of steering torque at a time of turning steering is increased, based on the result of determination by the friction transition state determination unit; and
a current driving unit that receives a current command value obtained by correcting the basic assist command value by use of the assist command correction value and that controls the motor current in such a way that the motor current coincides with the current command value, wherein the assist command correction value is corrected in such a way that in the case where the acceleration value of the vehicle reaches a predetermined value, the current command value is decreased.

In this invention, it is not required to utilize road-surface reaction torque; thus, the friction transition state can accurately be determined. As a result, it is not required to provide a road-surface reaction torque detector; thus, space-saving and reduction of man-hours for mounting can be achieved. Furthermore, it is not required to provide a road-surface reaction torque estimator; thus, there are demonstrated unprecedented prominent effects that the man-hours for designing are reduced and that the calculation load is lightened. Moreover, because the friction transition state can accurately be determined, it is made possible to stably and freely adjust the hysteresis width of the steering torque; concurrently, because it is suppressed that when the driver performs rapid deceleration during turning, the current command value is made to increase by the assist command correction value, the steering torque can be suppressed from becoming light and hence the steering feeling can be raised. In a situation where rapid deceleration and rapid turning steering are required, for example, on a winding road, it is suppressed that at a time of rapid deceleration on a curved road, the current command value is made to increase by the assist command correction value; thus, it is made possible that the hysteresis width of the steering torque is suppressed from increasing in the transition from turning steering to backward-turning steering so that the steering wheel readily returns to the neutral point.

(2) The steering control apparatus according to (1), wherein in the case where the acceleration value of the vehicle reaches a predetermined value, the current command value is decreased by correcting the result of determination by the friction transition state determination unit.

This invention makes it possible to prevent a decreasing change in the steering-axle reaction torque, caused by deceleration of the vehicle, from making the determination on the friction transition state by the friction transition state determination unit change without corresponding to the driver's operation of the steering wheel.

(3) The steering control apparatus according to any one of (1) and (2), further including a steering speed detection unit that detects a steering speed of the steering mechanism, wherein a sign indicating whether a steering-axle reaction torque changing amount is positive or negative and a sign indicating whether a steering speed detected by the steering speed detection unit is positive or negative are different from each other, the basic assist command value is corrected in such a way that the current command value is decreased.

This invention makes it possible to prevent that while the driver performs increasing-turning steering, rapid deceleration of the vehicle makes the steering-axle reaction torque decrease and hence it is determined that the present friction state is in the state of transition from static friction to dynamic friction, caused by backward-turning steering. As a result, it can be prevented that although the driver does not perform turning steering, the current command value is made to increase by the assist command correction value.

(4) The steering control apparatus according to (3), wherein the sign of the steering-axle reaction torque changing amount and the sign of the steering speed are different from each other, the current command value is decreased by correcting the result of determination by the friction transition state determination unit.

This invention makes it possible to prevent that while the driver performs increasing-turning steering, rapid deceleration of the vehicle makes the steering-axle reaction torque decrease and hence it is determined that the present friction state is in the state of transition from static friction to dynamic friction, caused by backward-turning steering. As a result, it can be prevented that although the driver does not perform turning steering, the current command value is made to increase by the assist command correction value.

(5) A steering control apparatus comprising:
a steering torque detection unit that detects steering torque of a steering mechanism steered by a driver of a vehicle;
a vehicle-speed detection unit that detects a vehicle speed of the vehicle;
an acceleration value detection unit that detects an acceleration value of the vehicle;
a motor that provides steering auxiliary power to the steering mechanism;
a basic assist command value calculation unit that calculates a basic assist command value, based on at least steering torque detected by the steering torque detection unit and a vehicle speed detected by the vehicle-speed detection unit;
an assist command value correction unit that calculates an assist command correction value for correcting the basic assist command value in such a way that a hysteresis width of steering torque at a time of turning steering by the driver is increased; and
a current driving unit that receives a current command value obtained by correcting the basic assist command value by use of the assist command correction value and that controls the motor current in such a way that the motor current coincides with the current command value,
wherein the current command value is corrected to decrease in the case where the acceleration value of the vehicle reaches a predetermined value.

In this invention, it is suppressed that when the driver performs rapid deceleration during turning, the current command value is made to increase by the assist command correction value; thus, the steering torque can be suppressed from becoming light and hence the steering feeling can be raised. In a situation where rapid deceleration and rapid turning steering are required, for example, on a winding road, it is suppressed that at a time of rapid deceleration on a curved road, the current command value is made to increase by the assist command correction value; thus, it is made possible that the hysteresis width of the steering torque is suppressed from increasing in the transition from turning steering to backward-turning steering so that the steering wheel readily returns to the neutral point.

DESCRIPTION OF REFERENCE NUMERALS

1: steering wheel
2: steering axle
3: turning steering wheel
4: torque sensor
5: motor
6: speed reducing mechanism
7: vehicle speed sensor
8: current sensor
9: control unit
10: current driving unit
11: basic assist command value calculation unit
12: steering-axle reaction torque calculation unit
13: friction transition state determination unit
14: assist command value correction unit
15: subtracter
16: differentiator
17: integrator 18: multiplier
19: acceleration sensor
30: corrector
31: steering speed sensor

The invention claimed is:

1. A steering control apparatus comprising:
   a steering torque detector to detect steering torque of a steering mechanism steered by a driver of a vehicle;
   a vehicle-speed detector to detect a vehicle speed of the vehicle;
   an acceleration value detector to detect an acceleration value of the vehicle;
   a motor that provides steering auxiliary power to the steering mechanism;
   a current sensor to detect a current flowing in the motor;
   a steering-axle reaction torque calculator to detect or calculate steering-axle reaction torque that acts on a steering axle of the steering mechanism based on the steering torque detected by the steering torque detector and the current detected by the current sensor;
   a basic assist command value calculator to calculate a basic assist command value, as a current command value for a motor current to be supplied to the motor, based on at least steering torque detected by the steering torque detector and a vehicle speed detected by the vehicle-speed detector;
   a friction transition state determiner to determine a transition state of friction torque that acts on the steering mechanism, based on the steering-axle reaction torque;
   an assist command value corrector to calculate an assist command correction value for correcting the basic assist command value in such a way that a hysteresis width of steering torque at a time of turning steering is increased, based on the result of determination by the friction transition state determiner; and
   a current driver to receive a current command value obtained by correcting the basic assist command value by use of the assist command correction value and to control the motor current in such a way that the motor current coincides with the current command value,
   wherein the assist command correction value is set to zero in the case where the acceleration value of the vehicle reaches a predetermined value.

2. The steering control apparatus according to claim 1, wherein in the case where the acceleration value of the vehicle reaches the predetermined value, the assist command correction value is set to zero by correcting the result of determination by the friction transition state determiner.

3. The steering control apparatus according to claim 1, further including a steering speed detector to detect a steering speed of the steering mechanism, wherein when a sign indicating whether a steering-axle reaction torque changing amount is positive or negative and a sign indicating whether a steering speed detected by the steering speed detector is positive or negative are different from each other, the assist command correction value is corrected in such a way that the current command value is decreased.

4. The steering control apparatus according to claim 3, wherein when the sign of the steering-axle reaction torque changing amount and the sign of the steering speed are different from each other, the current command value is decreased by correcting the result of determination by the friction transition state determiner.

5. The steering control apparatus according to claim 2, further including a steering speed detector to detect a steering speed of the steering mechanism, wherein when a sign indicating whether a steering-axle reaction torque changing amount is positive or negative and a sign indicating whether a steering speed detected by the steering speed detector is positive or negative are different from each other, the assist command correction value is corrected in such a way that the current command value is decreased.

6. The steering control apparatus according to claim 5, wherein when the sign of the steering-axle reaction torque changing amount and the sign of the steering speed are different from each other, the current command value is decreased by correcting the result of determination by the friction transition state determiner.

7. The steering control apparatus according to claim 1, wherein the steering-axle reaction torque calculator calculates the steering-axle reaction torque as a sum of the steering torque detected by the steering torque detector and a motor torque that acts on the steering axle, and
   wherein the motor torque that acts on the steering axle is determined based on the current detected by the current sensor.

8. A steering control apparatus comprising:
   a steering torque detector to detect steering torque of a steering mechanism steered by a driver of a vehicle;
   a vehicle-speed detector to detect a vehicle speed of the vehicle;
   an acceleration value detector to detect an acceleration value of the vehicle;
   a motor that provides steering auxiliary power to the steering mechanism;
   a current sensor to detect a current flowing in the motor;
   a basic assist command value calculator to calculate a basic assist command value, based on at least steering torque detected by the steering torque detector and a vehicle speed detected by the vehicle-speed detector;
   an assist command value corrector to calculate an assist command correction value, based on the steering torque detected by the steering torque detector and the current detected by the current sensor, for correcting the basic assist command value in such a way that a hysteresis width of steering torque at a time of turning steering by the driver is increased; and
   a current driver to receive a current command value obtained by correcting the basic assist command value by use of the assist command correction value and to control the motor current in such a way that the motor current coincides with the current command value,
   wherein the current command value is corrected to decrease in the case where the acceleration value of the vehicle reaches a predetermined value.

* * * * *